(12) United States Patent
Tokugawa et al.

(10) Patent No.: US 7,841,318 B2
(45) Date of Patent: Nov. 30, 2010

(54) CONTROL APPARATUS FOR INTERNAL COMBUSTION ENGINE

(75) Inventors: Kazuhito Tokugawa, Tochigi-ken (JP); Shinichi Ishikawa, Tochigi-ken (JP)

(73) Assignee: Keihin Corporation (JP)

( * ) Notice: Subject to any disclaimer, the term of this patent is extended or adjusted under 35 U.S.C. 154(b) by 271 days.

(21) Appl. No.: 12/200,803

(22) Filed: Aug. 28, 2008

(65) Prior Publication Data
US 2009/0076704 A1    Mar. 19, 2009

(30) Foreign Application Priority Data

Aug. 29, 2007    (JP) .............................. 2007-223062
Aug. 29, 2007    (JP) .............................. 2007-223063

(51) Int. Cl.
*F02P 5/00*    (2006.01)
*F02M 51/00*    (2006.01)

(52) U.S. Cl. ................................. 123/406.13; 123/479

(58) Field of Classification Search ............ 123/406.11, 123/406.13, 406.14, 479, 480; 701/102, 701/112, 113
See application file for complete search history.

(56) References Cited

U.S. PATENT DOCUMENTS

2002/0112536 A1*   8/2002   Shimoyama et al. ....... 73/117.3
2004/0154592 A1*   8/2004   Fujima et al. ........... 123/406.57
2006/0169249 A1*   8/2006   Shimoyama et al. ...  123/406.53
2007/0277782 A1*  12/2007   Nakauchi et al. ........ 123/406.53
2009/0063008 A1*   3/2009   Ishikawa et al. ............ 701/102
2009/0063015 A1*   3/2009   Tokugawa et al. ........... 701/103

FOREIGN PATENT DOCUMENTS

JP    2780257    5/1998
JP    3125587    11/2000

* cited by examiner

*Primary Examiner*—John T Kwon
(74) *Attorney, Agent, or Firm*—Cantor Colburn LLP

(57) ABSTRACT

A control apparatus for an internal combustion engine, includes: a crankshaft; a crank angle detection unit that outputs a crank signal; a generator that rotates in synchronization with the rotation of the crankshaft, and that outputs alternating voltage signals with one-phase; and a control unit, to which the alternating voltage signals are input, that ascertains ignition timings based on the crank signals, performs ignition control so as to spark the internal combustion engine at the ignition timings, determines a polarity of the alternating voltage signal each time the crank signal is detected, ascertains a polarity cycle of the alternating voltage signals based on the determination result of the polarity, and determines that a failure has occurred in the generator when the polarity cycles do not continuously coincide multiple times with the polarity cycles at the time of forward rotation of the crankshaft.

31 Claims, 16 Drawing Sheets

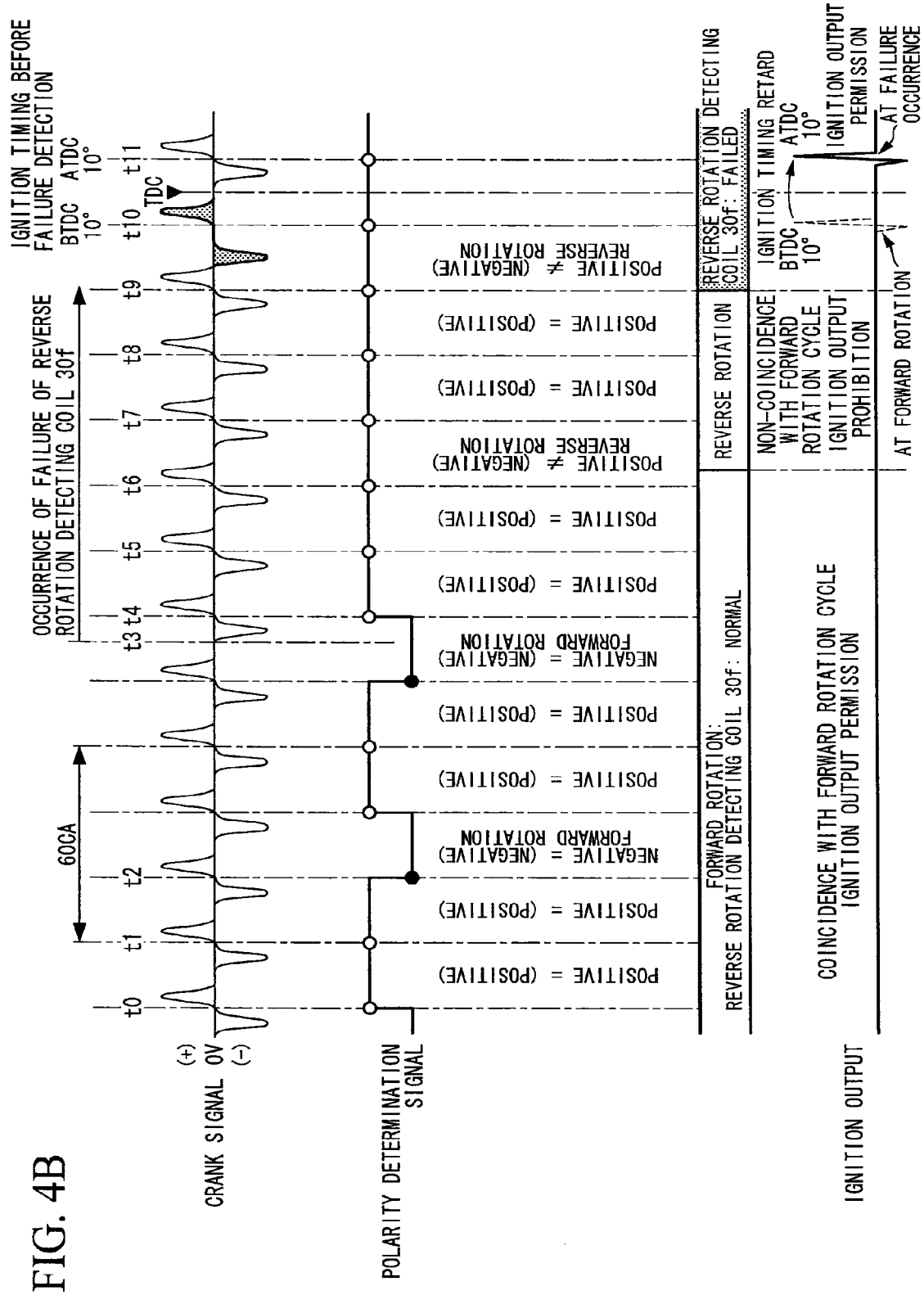

CONTROL APPARATUS FOR INTERNAL COMBUSTION ENGINE

This application is based on and claims priority from Japanese Patent Application No. 2007-223062, filed on Aug. 29, 2007, and Japanese Patent Application No. 2007-223063, filed on Aug. 29, 2007, the contents of which are incorporated herein by reference.

BACKGROUND OF THE INVENTION

1. Field of the Invention

The present invention relates to a control apparatus for an internal combustion engine, and particularly, to a control apparatus for an internal combustion engine having a reverse rotation detecting function of the internal combustion engine.

2. Description of Related Art

When ignition is made before a compression top dead center in a case where the rotational speed of a crankshaft is insufficient at the startup (cranking) of an internal combustion engine by manual operation, a phenomenon, so-called rebounding of kick pedal in which the crankshaft makes reverse rotation and a reverse rotation load is applied to manual starting operation devices (e.g., kick arm) may occur.

As techniques for preventing such rebounding of kick pedal, techniques mentioned in the following (1) and (2) are conventionally known.

(1) As disclosed in Japanese Patent No. 2780257, in an ignition device that performs ignition output according to an output voltage signal of a crank angle position detecting timing sensor (crank sensor), when the ignition device detects that an output voltage signal of a predetermined phase of the crank sensor does not coincide with an output voltage of one of the predetermined phases of a magnet-type AC generator that rotates in synchronization with a crankshaft, ignition output is stopped.

(2) As disclosed in Japanese Patent No. 3125587, in an ignition device that has a power source coil exclusive for ignition (so-called exciter coil) that is packaged in a magnet-type AC generator, the power source coil outputs an alternating voltage with a plurality of cycles per one revolution in synchronization with the rotation of a crankshaft, the ignition device causes ignition output to be stopped according to an output voltage of an exciter coil with a predetermined phase.

In the above conventional techniques, when a failure (e.g., a case where the magnet-type AC generator (including the exciter coil) to be used for detection of reverse rotation is disconnected, or is short-circuited from other power sources such a multiphase generator or a battery) has occurred, the reverse rotation cannot be detected, and it is impossible to prevent rebounding of kick pedal.

Furthermore, the above-described failure has occurred, it is not possible to determine that the internal combustion engine makes forward rotation or reverse rotation. Therefore, if startup of an internal combustion engine is impossible or the engine is under operation, an engine stall will occur.

Conventionally, since a technique of detecting a failure of the magnet-type AC generator to be used for detection of reverse rotation is not suggested, when a failure has occurred in such a magnet-type AC generator, there are problems in that rebounding of kick pedal cannot be prevented, startup of the engine is not possible, or, if the engine is under operation, an engine stall may occur.

SUMMARY OF THE INVENTION

The invention has been conceived in view of the above-described circumstances, and it is an object of the invention to provide a control apparatus for an internal combustion engine in which it is possible to detect a failure of a magnet-type AC generator that is used for detection of reverse rotation.

Furthermore, it is another object of the invention to provide a control apparatus for an internal combustion engine in which it is possible to prevent disabled startup, and any damage of parts constituting a startup drive system or an internal combustion engine body, after reverse rotation of the internal combustion engine was detected.

In order to achieve the above described object, the control apparatus for an internal combustion engine of a first aspect of the invention, includes: a crankshaft provided in the internal combustion engine; a crank angle detection unit that is provided in the internal combustion engine and that outputs a crank signal each time the crankshaft rotates by a predetermined angle; a generator that rotates in synchronization with the rotation of the crankshaft, and that outputs alternating voltage signals with one-phase; and a control unit, to which the alternating voltage signals are input, that ascertains ignition timings based on the crank signals, performs ignition control so as to spark the internal combustion engine at the ignition timings, determines a polarity of the alternating voltage signal each time the crank signal is detected, ascertains a polarity cycle of the alternating voltage signals based on the determination result of the polarity, and determines that a failure has occurred in the generator when the polarity cycles do not continuously coincide multiple times with the polarity cycles during forward rotation of the crankshaft.

Moreover, it is preferable that, in the control apparatus of the first aspect of the invention, the control unit determine that the crankshaft is in reverse rotation at the initial time when the polarity cycle of the alternating voltage signal does not coincide with the polarity cycle during forward rotation of the crankshaft and stop the ignition control at the ignition timings.

Moreover, it is preferable that the control apparatus of the first aspect of the invention further include: a rotation calculation unit that calculates an engine speed of the crankshaft based on the crank signals. In the control apparatus, when the control unit determines that a failure has occurred in the generator and when the engine speed of the crankshaft is less than a predetermined value, the control unit performs ignition control so as to spark the internal combustion engine at the ignition timing which is later than normal ignition timing.

Moreover, it is preferable that, in the control apparatus of the first aspect of the invention, the control unit determine that the crankshaft is in reverse rotation at the initial time when the polarity cycle of the alternating voltage signal does not coincide with the polarity cycle during forward rotation of the crankshaft. In the control apparatus, when the engine speed of the crankshaft is less than a predetermined value, the control unit stops the ignition control at the ignition timings.

According to the first aspect of the invention, if the polarity cycles of one-phase alternating voltage signals output from the generator (magnet-type AC generator) that rotates in synchronization with a crankshaft do not continuously coincide multiple times with the polarity cycles at the time of forward rotation of the crankshaft, it is presumed that a failure has occurred in the magnet-type AC generator. Thus, according to the invention, it is possible to detect a failure of the generator to be used for detection of reverse rotation.

In order to achieve the above described object, the control apparatus for an internal combustion engine of a second aspect of the invention, includes: a crank angle detection unit that is provided in the internal combustion engine and that outputs a crank signal each time the crankshaft rotates by a predetermined angle; a generator that rotates in synchronization with the rotation of the crankshaft, and that outputs alternating voltage signals with one-phase; and a control unit, to which the alternating voltage signals are input, that ascertains ignition timings based on the crank signals, performs ignition control so as to spark the internal combustion engine at the ignition timings, determines a polarity of the alternating voltage signal each time the crank signal is detected, and determines that a failure has occurred in the generator when the polarity is not changed.

Moreover, it is preferable that, in the control apparatus of the second aspect of the invention, the control unit count the number of times at which the alternating voltage signal is a predetermined polarity until the ignition timing arrives, and determine that a failure has occurred in the generator when the counting result is less than a predetermined number.

In order to achieve the above described object, the control apparatus for an internal combustion engine of a third aspect of the invention, includes: a crankshaft provided in the internal combustion engine; a crank angle detection unit that is provided in the internal combustion engine and that outputs a crank signal each time the crankshaft rotates by a predetermined angle; a generator that rotates in synchronization with the rotation of the crankshaft, and that outputs alternating voltage signals with one-phase; an intake state detection unit that detects an intake state value that indicates an intake state in the internal combustion engine, and that outputs intake state signals; and a control unit, to which the alternating voltage signals and the intake state signals are input, that ascertains ignition timings based on the crank signals, performs ignition control so as to spark the internal combustion engine at the ignition timings, determines each predetermined cycle whether or not the intake state value is changed based on the intake state signals, determines each predetermined cycle whether or not a polarity of the alternating voltage signal is changed, and determines that a failure has occurred in the generator when the intake state value is changed and the polarity of the alternating voltage signal is not changed.

Moreover, it is preferable that, in the control apparatus of the third aspect of the invention, when the number of times at which a difference between a previous intake state value and a current intake state value is greater than or equal to a predetermined value is not zero, the control unit determine that the intake state value is changed. In the control apparatus, when the number of times at which the alternating voltage signal is a predetermined polarity is zero, the control unit determines that the polarity is not changed.

In order to achieve the above described object, the control apparatus for an internal combustion engine of a fourth aspect of the invention, includes: a crankshaft provided in the internal combustion engine; a crank angle detection unit that is provided in the internal combustion engine and that outputs a crank signal each time the crankshaft rotates by a predetermined angle; a generator that rotates in synchronization with the rotation of the crankshaft, and that outputs alternating voltage signals with one-phase; an intake state detection unit that detects an intake state value that indicates an intake state in the internal combustion engine, and that outputs intake state signals; and a control unit, to which the alternating voltage signals and the intake state signals are input, that ascertains ignition timings based on the crank signals, performs ignition control so as to spark the internal combustion engine at the ignition timings, determines each predetermined cycle whether or not the intake state value is changed based on the intake state signals, determines each predetermined cycle whether or not the crank signal is input and whether or not a polarity of the alternating voltage signal is changed, and that determines that a failure has occurred in the generator when the change of the intake state value is present, the input of the crank signal is present, and the change of polarity of the alternating voltage signal is absent.

Moreover, it is preferable that, in the control apparatus of the fourth aspect of the invention, when the number of times at which a difference between a previous intake state value and a current intake state value is greater than or equal to a predetermined value is not zero, the control unit determine that the change of the intake state value is present. In the control apparatus, when the number of input times of the crank signals is not zero, the control unit determines that the input of the crank signal is present. In the control apparatus, when the number of times at which the alternating voltage signal is a predetermined polarity is zero, the control unit determines that the change of polarity of the alternating voltage signal is absent.

Moreover, it is preferable that, in the control apparatus of the fourth aspect of the invention, when the change of the intake state value is present and the input of the crank signal is absent, the control unit determine that a failure has occurred in the crank angle detection unit.

Moreover, it is preferable that, in the control apparatus of the third and the fourth aspects of the invention, an intake pressure signal corresponding to the intake pressure inside an intake pipe of the internal combustion engine or an intake rate signal corresponding to the intake rate inside the intake pipe be used as the intake state signal.

Moreover, it is preferable that, in the control apparatus of the first, the second, the third, and the fourth aspects of the invention, when the control unit determines that a failure has occurred in the generator, the control unit perform ignition control so as to spark the internal combustion engine at the ignition timing which is later than normal ignition timing.

Moreover, it is preferable that the control apparatus of the second, the third, and the fourth aspects of the invention further include: a rotation calculation unit that calculates an engine speed of the crankshaft based on the crank signals. In the control apparatus, when the control unit determines that a failure has occurred in the generator and that the engine speed is less than a predetermined value, the control unit performs the ignition control at the ignition timing which is later than normal ignition timing.

Moreover, it is preferable that, in the control apparatus of the second, the third, and the fourth aspects of the invention, when the control unit does not determine that a failure has occurred in the generator, the control unit determine a polarity of the alternating voltage signal at the ignition timing. In the control apparatus, when the polarity does not coincide with the polarity at the time of forward rotation of the crankshaft, the control unit determines that the crankshaft is in reverse rotation and stops the ignition control at the ignition timings.

Moreover, it is preferable that the control apparatus of the first, the second, the third, and the fourth aspects of the invention further include: a reference voltage source generating reference voltage signals; a comparing unit, to which the alternating voltage signals and the reference voltage signals are input, that compares the voltage value of the alternating voltage signals with the voltage value of the reference voltage signals, and outputs comparison result signals indicating a comparison result; and a waveform shaping unit, to which the crank signals are input, that performs waveform shaping so that the crank signals are formed into square-wave pulse signals, the cycle of the pulse signal being the time required for the rotation of the predetermined angle. In the control apparatus, the control unit determines the polarity of the alternating voltage signal based on the comparison result signal each time the pulse signal is detected.

Moreover, it is preferable that the control apparatus of the first, the second, the third, and the fourth aspects of the invention further include: a notification unit provided in an external of the internal combustion engine. In the control apparatus, when the control unit determines that a failure has occurred in the generator, the control unit controls the notification unit so as to notify a user of a failure occurrence.

According to the second, the third, and the fourth aspects of the invention, if there is no change in the polarity of one-phase alternating voltage signals output from the generator that rotates in synchronization with a crankshaft irrespective of the fact that a crank signal is input, it is presumed that a failure has occurred in the generator. Thus, according to the invention, it is possible to detect a failure of the generator to be used for detection of reverse rotation.

BRIEF DESCRIPTION OF THE DRAWINGS

FIGS. 4A and 4B are explanatory diagrams relating to the operation of the control apparatus for an internal combustion engine (ECU 4) according to the first embodiment of the invention.

DETAILED DESCRIPTION OF THE INVENTION

An embodiment of the invention will be described with reference made to the drawings.

Figure 1:
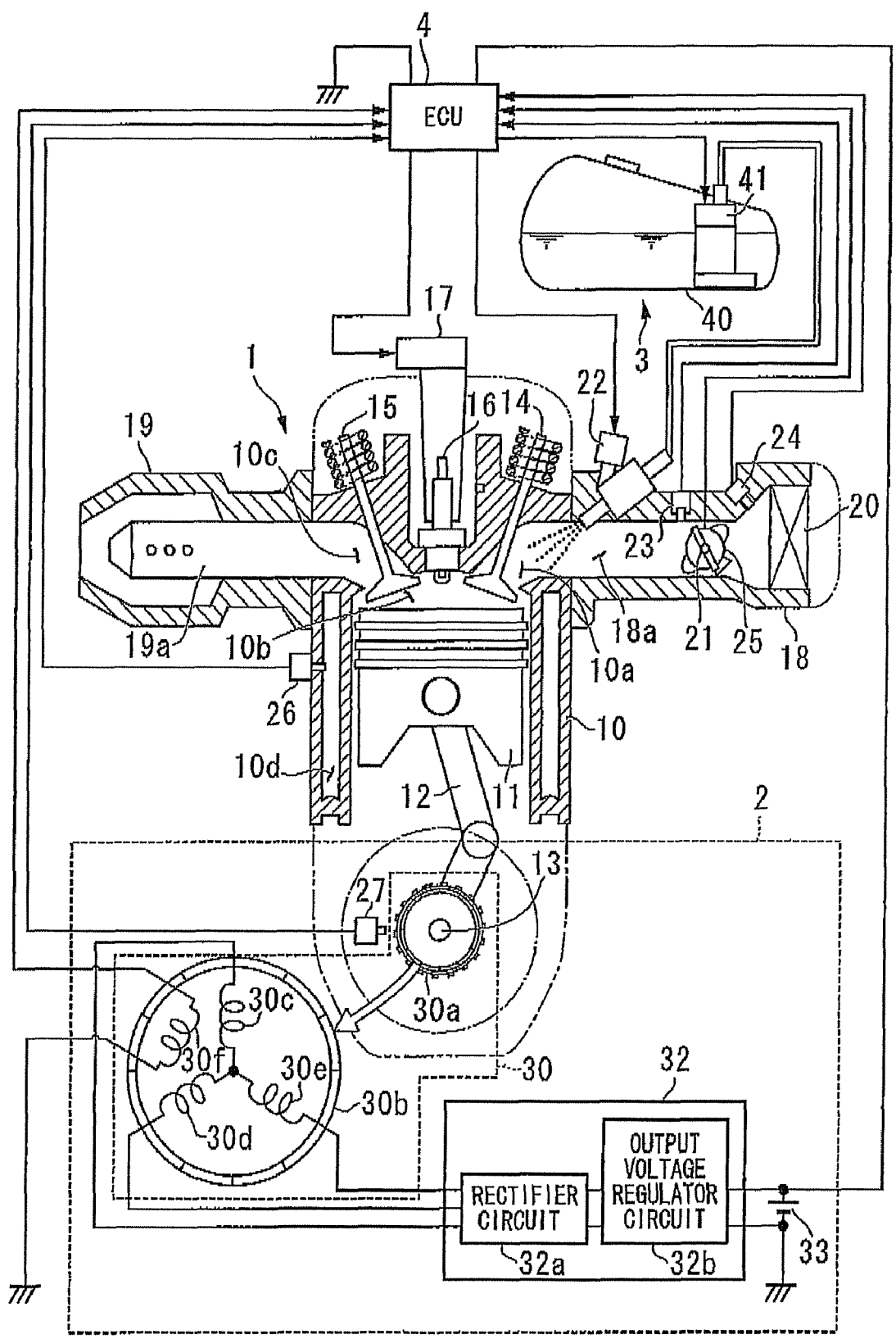
FIG. 1 is a structural schematic diagram of an engine system that is provided with a control apparatus for an internal combustion engine (ECU 4) according to a first embodiment of the invention.

FIG. 1 is a structural schematic view showing an engine control system that is provided with the fuel injection control apparatus (referred to below as an ECU) of the embodiment.

As shown in FIG. 1, the engine control system of the embodiment is schematically formed by an engine 1, a power supply unit 2, a fuel supply unit 3, and an ECU (Engine Control Unit) 4.

The engine (i.e., internal combustion engine) 1 is a four-stroke single-cylinder engine, and schematically includes a cylinder 10, a piston 11, a conrod 12, a crankshaft 13, an intake valve 14, an exhaust valve 15, a spark plug 16, an ignition coil 17, an intake pipe 18, an exhaust pipe 19, an air cleaner 20, a throttle valve 21, an injector 22, an intake pressure sensor 23, an intake temperature sensor 24, a throttle opening angle sensor 25, a cooling water temperature sensor 26, and a crank angle sensor 27.

The cylinder 10 is a hollow circular cylinder-shaped component that is used to make the piston 11 that is located inside it undergo a reciprocating motion by repeating a four-stroke cycle consisting of intake, compression, combustion (i.e., expansion), and exhaust.

The cylinder 10 has an intake port 10a, a combustion chamber 10b, and an exhaust port 10c.

The intake port 10a is a flow path that is used to supply a mixture formed from air and fuel to the combustion chamber 10b.

The combustion chamber 10b is a space that is used to store the aforementioned mixture and cause mixture that has been compressed in the compression stroke to be combusted in the combustion stroke.

The exhaust port 10c is a flow path that is used to discharge exhaust gas from the combustion chamber 10b to the outside in the exhaust stroke.

Moreover, a water cooling path 10d that is used to circulate cooling water is provided in an outer wall of the cylinder 10.

The crankshaft 13 that is used to convert the reciprocating motion of the piston 11 into rotational motion is joined via the conrod 12 to the piston 11.

The crankshaft 13 extends in a direction that is orthogonal to the reciprocation direction of the piston 11. A flywheel (not shown), a mission gear, a kick gear that is joined to a kick pedal that is used to start the engine 1 manually, and a rotor 30a of the power supply unit 2 (described below) are joined to the crankshaft 13.

The intake valve 14 is a valve component that is used to open and close an aperture portion of the air intake port 10a which is near to the combustion chamber 10b, and is joined to a camshaft (not shown). The intake valve 14 is driven to open and close in accordance with the respective strokes by this camshaft.

The exhaust valve 15 is a valve component that is used to open and close an aperture portion of the air exhaust port 10c which is near to the combustion chamber 10b, and is joined to a camshaft (not shown). The exhaust valve 15 is driven to open and close in accordance with the respective strokes by this camshaft.

The spark plug 16 has electrodes that face towards the interior of the combustion chamber 10b, and is provided in a topmost portion of the combustion chamber 10b. The spark plug 16 generates a spark between the electrodes by a high-voltage ignition voltage signal that is supplied from the ignition coil 17.

The ignition coil 17 is a transformer that is formed by a primary coil and a secondary coil. The ignition coil 17 boosts an ignition voltage signal that is supplied from the ECU 4 to the primary coil, and supplies an ignition voltage signal from the secondary coil to the spark plug 16.

The intake pipe 18 is an air supply pipe, and has an intake flow path 18a provided inside it.

The intake pipe 18 is joined to the cylinder 10 so that the intake flow path 18a is connected to the intake port 10a.

The exhaust pipe 19 is a pipe for discharging exhaust gas, and has an exhaust flow path 19a provided inside it.

The exhaust pipe 19 is joined to the cylinder 10 so that the exhaust flow path 19a is connected to the exhaust port 10c.

The air cleaner 20 is located upstream from the air flowing through the interior of the intake pipe 18.

The air cleaner 20 purifies air taken in from the outside and supplies it to the intake flow path 18a.

The throttle valve 21 is provided inside the intake flow path 18a, and pivots by a throttle (not shown) or an accelerator.

Namely, the cross-sectional area of the intake flow path 18a is changed by the pivoting of the throttle valve 21, and the air intake quantity is accordingly changed.

The injector 22 has an injection aperture that injects fuel that is supplied from the fuel supply unit 3 in accordance with injector drive signals that are supplied from the ECU 4.

The injector 22 is provided inside the intake pipe 18 so that the injection aperture faces the intake port 10a.

The intake pressure sensor (i.e., intake state detection unit) 23 is, for example, a semiconductor pressure sensor that utilizes a piezoresistive effect.

The intake pressure sensor 23 is provided in the intake pipe 18 at a position downstream from the airflow passing through the throttle valve 21 so that a sensitive surface of the intake pressure sensor 23 is oriented towards the intake flow path 18a.

The intake pressure sensor 23 outputs intake pressure signals (intake state signals) that correspond to the intake pressure (an intake state value) inside the intake pipe 18 to the ECU 4.

The intake temperature sensor 24 is provided in the intake pipe 18 at a position upstream from the airflow passing through the throttle valve 21 so that a sensitive portion of the intake temperature sensor 24 is oriented towards the intake flow path 18a.

The intake temperature sensor 24 outputs intake temperature signals that correspond to the intake air temperature inside the intake pipe 18 to the ECU 4.

The throttle opening angle sensor 25 outputs throttle opening angle signals that correspond to the opening angle of the throttle valve 21 to the ECU 4.

The cooling water temperature sensor 26 is provided so that a sensitive portion of the cooling water temperature sensor 26 is oriented towards the cooling water path 10d of the cylinder 10.

The cooling water temperature sensor 26 outputs cooling water temperature signals that correspond to the temperature of the cooling water flowing through the cooling water path 10d to the ECU 4.

The crank angle sensor (i.e., a crank angle detection unit) 27 outputs crank signals each time the crankshaft 13 rotates by a predetermined angle in synchronization with the rotation of the crankshaft 13. The crank angle sensor 27 is described in detail below.

The power supply unit 2 includes a generator 30, a regulate rectifier 32, and a battery 33.

The generator 30 is a magnetic AC generator and includes a rotor 30a, permanent magnets 30b, 3-phase stator coils 30c, 30d, and 30e, and a reverse rotation detecting coil (reverse rotation detection unit) 30f.

The rotor 30a is joined to the crankshaft 13 of the engine 1 and rotates in synchronization therewith.

The permanent magnets 30b are mounted on an inner circumferential side of the rotor 30a.

The 3-phase stator coils 30c, 30d, and 30e are coils that are used to obtain generated output.

Namely, in the generator 30, as a result of the rotor 30a (in other words, the permanent magnets 30b) rotating relative to the fixed stator coils 30c, 30d, 30e, and the reverse rotation detecting coil 30f, 3-phase AC voltage signal is generated by electromagnetic induction from the stator coils 30c, 30d, and 30e, and one-phase AC voltage signal is generated from the reverse rotation detecting coil 30f. The 3-phase AC voltage signal that has been generated from the stator coils 30c, 30d, and 30e is output to the regulate rectifier 32. The alternating voltage signal that has been generated from the reverse rotation detecting coil 30f is output to the ECU 4.

Figure 2:
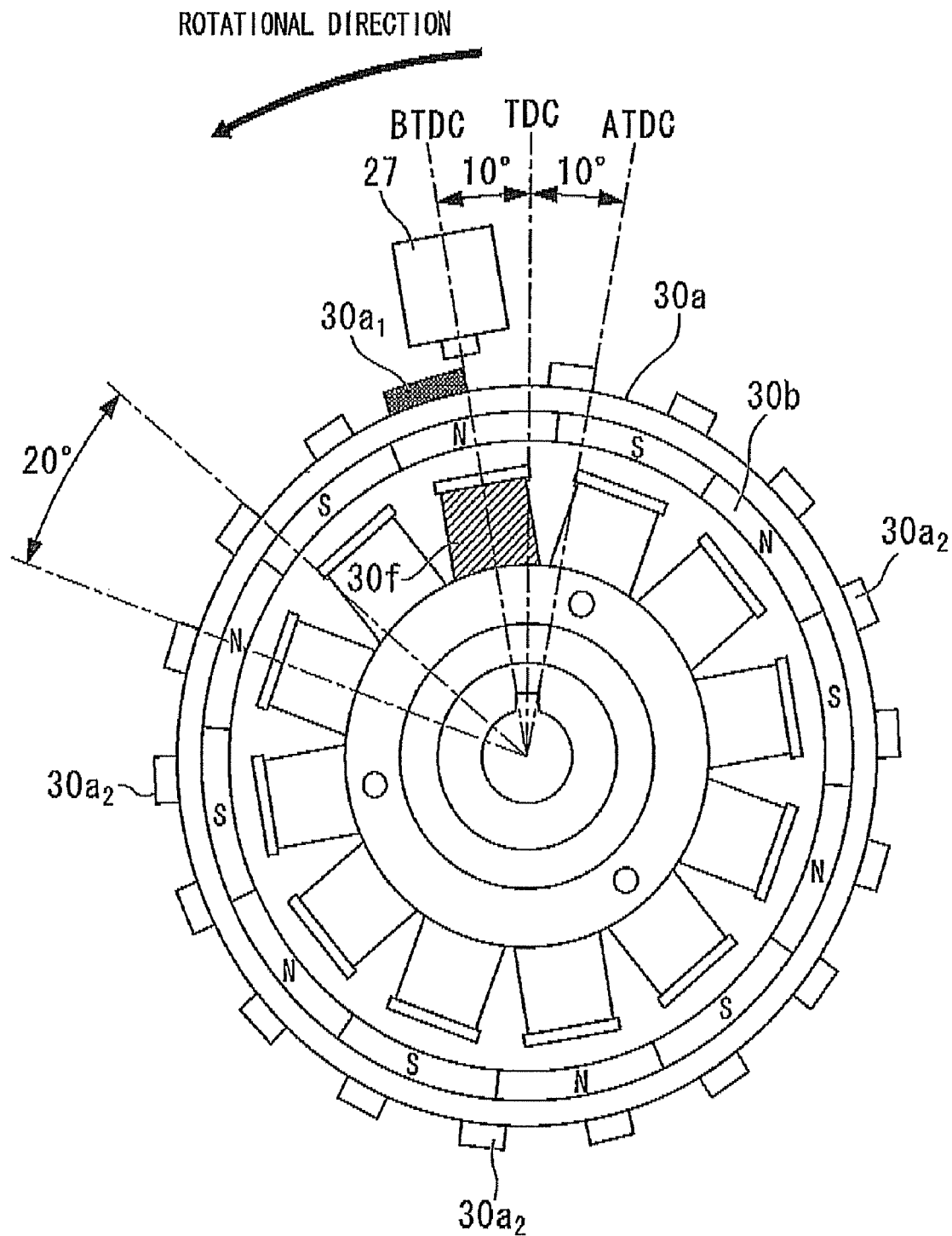
FIG. 2 is a detailed explanatory diagram of a rotor 30a constituting a generator 30 according to the first embodiment of the invention.

As shown in FIG. 2, a plurality of projections is formed on an outer circumference of the rotor 30a extending in the rotation direction of the rotor 30a.

Specifically, a plurality of projections (i.e., auxiliary projections) $30a_2$ whose length is shorter in the rotation direction, and a projection (i.e., a crank angle reference projection) $30a_1$ whose length in the rotation direction is longer than that of the projections $30a_2$, are formed on the outer circumference of the rotor 30a.

Here, the length of the crank angle reference projection $30a_1$ is, as an example, approximately twice the length of the auxiliary projections $30a_2$.

The plurality of auxiliary projections $30a_2$ and the crank angle reference projection $30a_1$ are provided so that the respective rear ends of each of the plurality of auxiliary projections $30a_2$ and the crank angle reference projection $30a_1$ are located at the same angular interval (for example, at 20° intervals).

In the embodiment, the crank angle reference position is a position to the front in the rotation direction of a position corresponding to the top dead center TDC, for example, the position BTDC 10° which is a position 10° before the top dead center.

In addition, the position of the rear end of the crank angle reference projection $30a_1$ matches the crank angle reference position.

In addition, the position of rear end of the auxiliary projections $30a_2$, that is the position to the back in the rotation direction of the crank angle reference projection $30a_1$, namely, the position 10° back a position corresponding to the top dead center TDC in the rotation direction, referred to ATDC.

For example, the position ATDC 10°, that is a position 10° back the top dead center, is the crank angle reference position at a failure corresponding to the ignition timing when failure detection is detected. Here, the "when failure detection is detected" means a case of the detection of the failure occurrence of the reverse rotation detecting coil 30f (e.g., short-circuiting, disconnection).

Moreover, the permanent magnets 30b are mounted on the inner circumferential side of the rotor 30a.

Specifically, the permanent magnets 30b that are constructed with an N pole and an S pole forming one set are placed every 60° along the inner circumferential side of the rotor 30a.

The reverse rotation detecting coil 30f is provided at the crank angle reference position. One end (first end) of the reverse rotation detecting coil 30f is connected to a ground line. The other end (second end) of the reverse rotation detecting coil 30f is connected to the ECU 4, specifically, connected to an inversion input terminal of a comparator circuit 53. Namely, the reverse rotation detecting coil 30f generates one-phase AC voltage signal whose cycle is the length of time it takes for the rotor 30a (crankshaft 13) to rotate 60°.

The aforementioned crank angle sensor 27 is, for example, an electromagnetic pickup sensor and, as shown in FIG. 2, is provided in the vicinity of the outer circumference of the rotor 30a.

The crank angle sensor 27 outputs a pair of pulse signals having mutually different polarities each time the crank angle reference projection $30a_1$ and the auxiliary projections $30a_2$ pass the vicinity of the crank angle sensor 27.

More specifically, the crank angle sensor 27 outputs a pulse signal having a negative polarity amplitude when the front end of each projection goes past in the rotation direction, and outputs a pulse signal having a positive polarity amplitude when the rear end of each projection goes past in the rotation direction.

The description returns now to FIG. 1.

The regulate rectifier 32 includes a rectifier circuit 32a and an output voltage regulator circuit 32b.

The rectifier circuit 32a includes six rectifier circuits that are connected in a 3-phase bridge structure and are used to rectify the 3-phase AC voltage input from the respective stator coils 30c, 30d, and 30e. The rectifier circuit 32a rectifies this 3-phase AC voltage to DC voltage and outputs it to the output voltage regulator circuit 32b.

The output voltage regulator circuit 32b rectifies the DC voltage input from the rectifier circuit 32a, and generates power supply voltage, and supplies the power supply voltage to the ECU 4 and the battery 33.

The battery 33 is charged depending on the power supply voltage supplied from the output voltage regulator circuit 32b. The battery 33 supplies power supply voltage to the ECU 4 when the generator 30 does not supplies power supply voltage to the ECU 4, for example, startup.

The fuel supply unit 3 is formed by a fuel tank 40 and a fuel pump 41.

The fuel tank 40 is a container that is used to hold fuel such as, for example, gasoline.

The fuel pump 41 is provided inside the fuel tank 40, and pumps out fuel inside the fuel tank 40 and supplies it to the injector 22 in accordance with pump drive signals input from the ECU 4.

Figure 3:
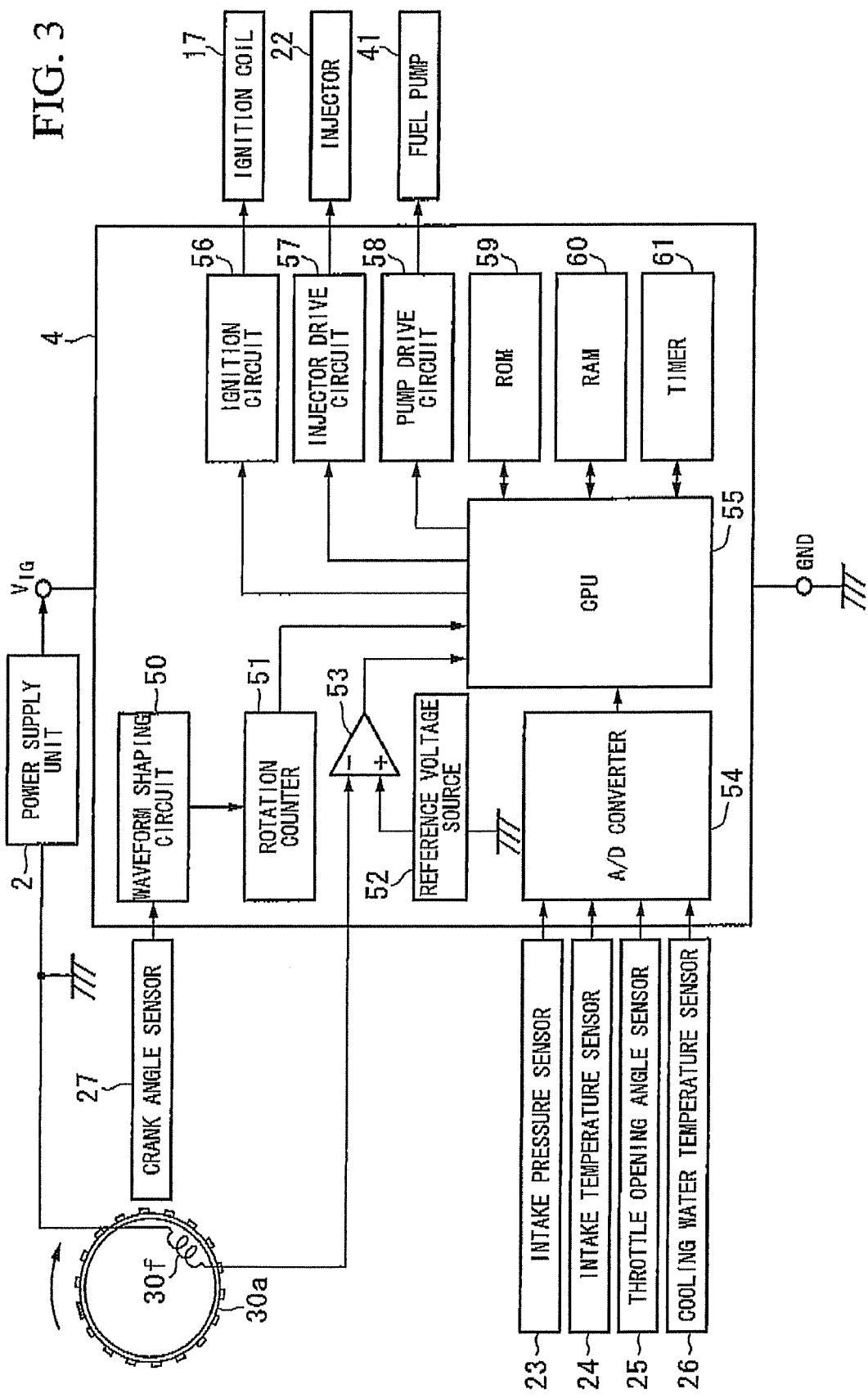
FIG. 3 is a structural block diagram of the control apparatus for an internal combustion engine (ECU 4) according to the first embodiment of the invention.

As shown in FIG. 3, the ECU 4 includes a waveform shaping circuit 50, a rotation counter 51, a reference voltage source 52, a comparator circuit 53, an A/D converter 54, a CPU (Central Processing Unit) 55, an ignition circuit 56, an injector drive circuit 57, a pump drive circuit 58, ROM (Read Only Memory) 59, RAM (Random Access Memory) 60, and a timer 61.

The ECU 4 which is constructed in this manner is driven by power supply voltage that is supplied from the power supply unit 2.

A $V_{IG}$ terminal of the ECU 4 is connected to an output terminal on a positive pole side of the output voltage regulator circuit 32b.

A GND terminal of the ECU 4 is connected to a ground line and to a terminal on a negative pole side of the battery 33.

The waveform shaping circuit (waveform shaping unit) 50 performs waveform shaping to change pulse form crank signals that are input from the crank angle sensor 27 into square wave pulse signals (for example, to change negative polarity crank signals into high level signals, and change positive polarity crank and ground level crank signals into low level signals), and outputs the waveform-shaped signals to the rotation counter 51 and the CPU 55.

Namely, these square wave pulse signals are square wave pulse signals whose cycle is the length of time it takes for the crankshaft 13 to rotate 20°.

The rotation counter (rotation calculation unit) 51 calculates the engine speed based on the square wave pulse signals that are output from the above-described waveform shaping circuit 50, and outputs a rotation count signal that shows the relevant engine speed to the CPU 55.

The reference voltage source 52 generates reference voltage signal that is DC voltage having a negative-polarity, and outputs this reference voltage signal to a non-inversion input terminal of the comparator circuit 53. The comparator circuit (comparing unit) 53 is constituted by an operational amplifier including an inversion input terminal and a non-inversion input terminal. The alternating voltage signal that is output from the reverse rotation detecting coil 30f is input to the inversion input terminal of the comparator circuit 53. The reference voltage signal that is output from reference voltage source 52 is input to the non-inversion input terminal of the comparator circuit 53. The comparator circuit 53 compares the voltage value of the above-described alternating voltage signal with the voltage value of the reference voltage signal, and outputs a comparison result signal indicating a comparison result to the CPU 55. Specifically, when the voltage value of the alternating voltage signal is greater than the voltage value of the reference voltage signal, the comparator circuit 53 outputs the comparison result signal having a high level. When the voltage value of the alternating voltage signal is less than the voltage value of the reference voltage signal, the comparator circuit 53 outputs the comparison result signal having a low level.

The A/D converter 54 converts into digital signals intake pressure sensor outputs that are output from the intake pressure sensor 23, intake temperature sensor outputs that are output from the intake temperature sensor 24, throttle opening angle sensor outputs that are output from the throttle opening angle sensor 25, and cooling water temperature sensor outputs that are output from the cooling water temperature sensor 26, and then outputs these digital signals to the CPU 55.

The CPU (i.e., control unit) 55 executes an engine control program that is stored in the ROM 59, and performs control of the fuel injection, ignition, and fuel supply of the engine 1 based on the crank signals, the rotation count signals that are output from the rotation counter 51, the comparison result signals that are output from the comparator circuit 53, the intake pressure values that have been converted by the A/D converter 54, the throttle opening angle values, and cooling water temperature values.

Specifically, the CPU 55 outputs ignition control signals to the ignition circuit 56 in order to cause the spark plug 16 to spark at the ignition timing. The CPU 55 also outputs fuel injection control signals to the injector drive circuit 57 in order to cause a predetermined quantity of fuel to be injected from the injector 22 at the fuel injection timing, and also outputs fuel supply control signals to the pump drive circuit 58 in order for fuel to be supplied to the injector 22.

The ignition circuit 56 is provided with a condenser (not shown) that accumulates $V_{IG}$ voltage, namely, the power supply voltage which is supplied from the power supply unit 2, and, in accordance with an ignition control signal input from the above-described CPU 55, discharges the electric charge which has accumulated in the condenser as an ignition voltage signal to a primary coil of the ignition coil 17.

In accordance with fuel injection control signals that are input from the above described CPU 55, the injector drive circuit 57 generates injector drive signals in order to cause a predetermined quantity of fuel to be injected from the injector 22, and outputs these injector drive signals to the injector 22.

In accordance with fuel supply control signals that are input from the CPU 55, the pump drive circuit 58 generates pump drive signals in order to cause fuel to be supplied from the fuel pump 41 to the injector 22, and outputs these pump drive signals to the fuel pump 41.

The ROM 59 is non-volatile memory in which engine control programs that are executed by the CPU 55 and various types of data are stored in advance.

The RAM 60 is working memory that is used to temporarily hold data when the CPU 55 is executing an engine control program and performing various operations.

The timer 61 performs predetermined timer (i.e., clock) operations under the control of the CPU 55.

Next, the reverse rotation prevention processing of an ECU 4 (in particular, of a CPU 55) during the operation of an engine 1 in an engine control system that is provided with the ECU 4 (i.e., a control apparatus for an internal combustion engine) of a first embodiment that is constructed in the manner described above will be described.

Figure 4A:
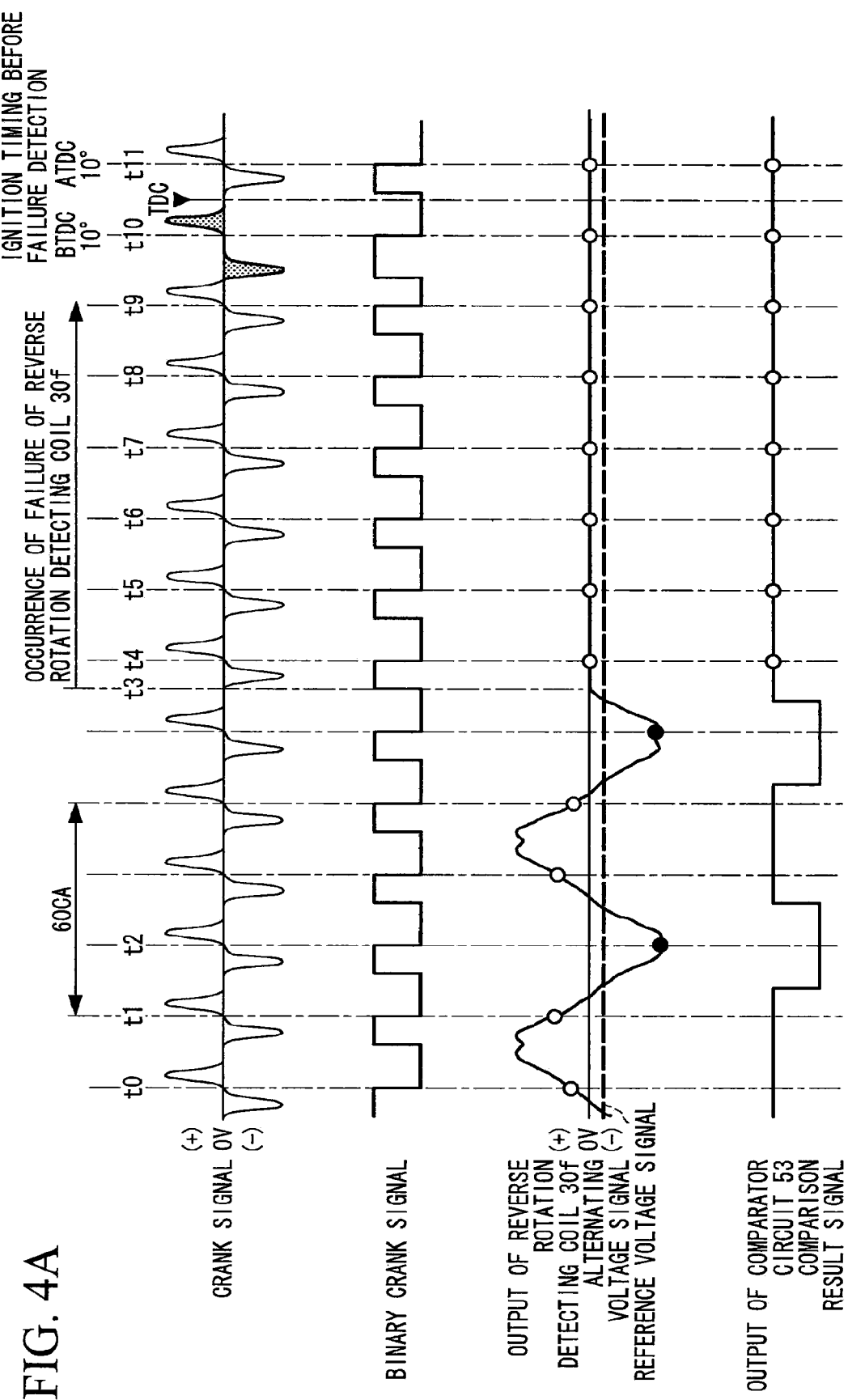

FIGS. 4A and 4B are timing charts showing the correspondence relationship among crank signals output from the crank angle sensor 27, waveform-shaped crank signals output from the waveform shaping circuit 50, alternating voltage signals output from the reverse rotation detecting coil 30f, reference voltage signals output from the reference voltage source 52, comparison result signals output from the comparator circuit 53, and polarity determination results of alternating voltage signals.

As shown in FIGS. 4A and 4B, during the operation of the engine 1, the rotor 30a also rotates in synchronization with the rotation of the crankshaft 13, and the crank angle sensor 27 outputs pulsed crank signals having a negative-polarity amplitude when the front end of each projection passes therethrough in the rotational direction, and outputs pulsed crank signals having a positive-polarity amplitude when the rear end of each projection passes therethrough in the rotational direction.

Furthermore, the waveform shaping circuit 50 outputs crank signals (square-wave pulse signals) the waveform of which has been shaped such that negative-polarity crank signals have a high level, and positive-polarity and ground-level crank signals have a low level.

That is, the time between falling edges of waveform-shaped crank signals is equivalent to the time which is taken for the crankshaft 13 to rotate 20°.

Furthermore, from the reverse rotation detecting coil 30f, alternating voltage signals in which the time which is taken for the rotor 30a (crankshaft 13) to rotate 60° becomes one cycle are output. From the comparator circuit 53, high-level comparison result signals are output when the voltage values of alternating voltage signals are greater than the voltage values of reference voltage signals (i.e., when the alternating voltage signals have a positive polarity), and low-level comparison result signals are output when the voltage values of the alternating voltage signals are less than the voltage values of reference voltage signals (i.e., when the alternating voltage signals have a negative polarity).

During the operation of the engine 1, the CPU 55 performs the reverse rotation prevention processing on the basis of the waveform-shaped crank signals and comparison result signals as described above.

Figure 5:
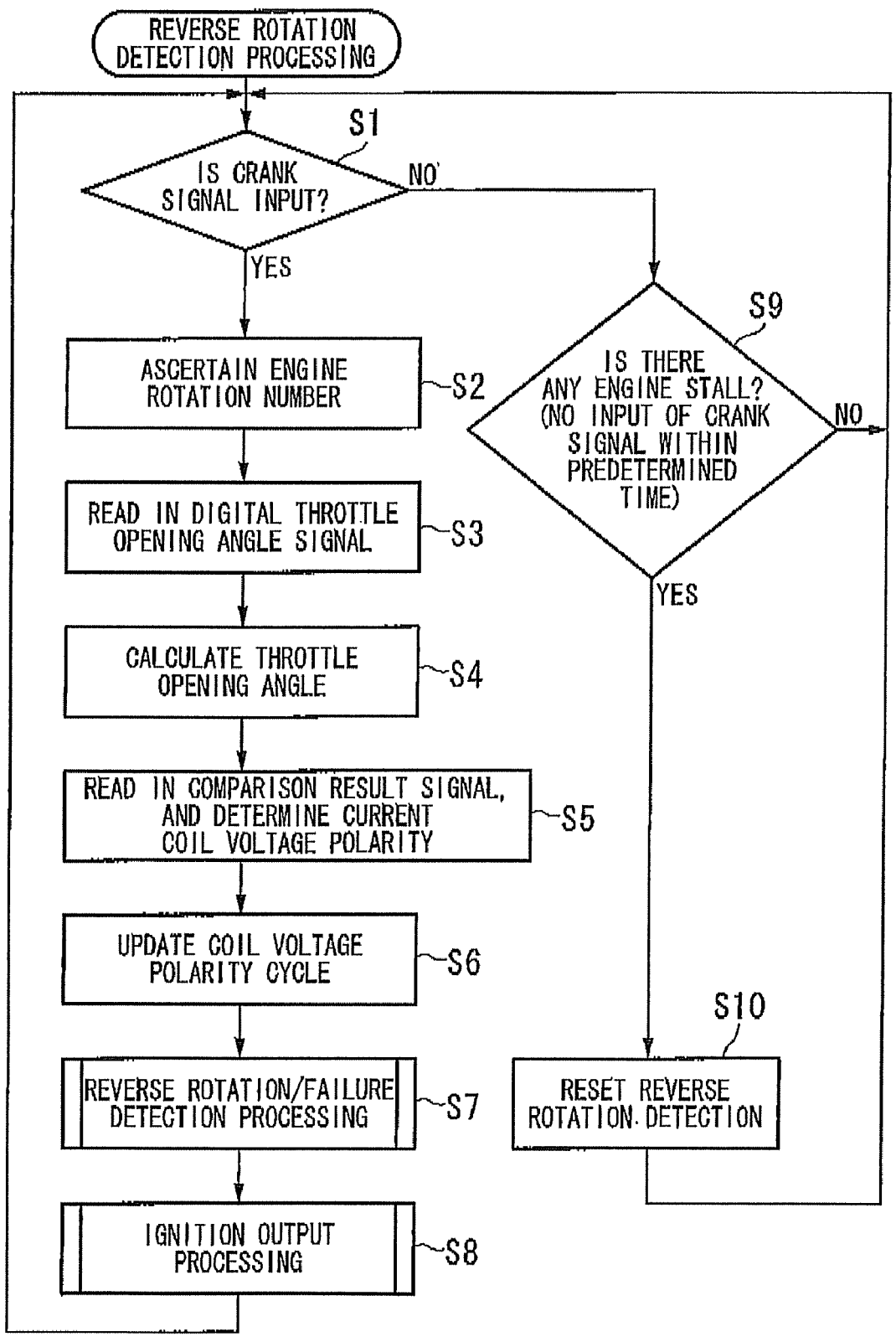
FIG. 5 is a flowchart relating to the operation of the control apparatus for an internal combustion engine (ECU 4) according to the first embodiment of the invention.

FIG. 5 is an operation flowchart of the CPU 55 relating to the reverse rotation prevention processing.

As shown in FIG. 5, first, the CPU 55 determines whether or not a waveform-shaped crank signal has been input (a falling edge has been detected) (Step S1). If the waveform-shaped crank signal has been input ("YES"), the CPU reads in an rpm signal from the rotation counter 51 to ascertain an engine rotation number (engine speed) (Step S2).

Then, the CPU 55 reads in a digital throttle opening angle signal from the A/D converter 54 (Step S3), and calculates the throttle opening angle of the throttle valve 21 on the basis of the digital throttle opening angle signal (Step S4).

Then, the CPU 55 reads in a comparison result signal and determines the polarity (hereinafter referred to as a "current coil voltage polarity") of a current alternating voltage signal, in synchronization with the falling edge of the waveform-shaped crank signal (Step S5).

That is, if the comparison result signal has a high level, the CPU 55 determines the current coil voltage polarity to be a positive polarity, and if the comparison result signal has a low level, the CPU determines the current coil voltage polarity to be a negative polarity.

Then, the CPU 55 updates a polarity cycle (hereinafter referred to as a "coil voltage polarity cycle") of the alternating voltage signal on the basis of the determination result of the current coil voltage polarity (Step S6).

Hereinafter, the processing of Steps S5 and S6 will be specifically described.

As shown in FIGS. 4A and 4B, a case where falling edges of waveform-shaped crank signals have been detected at points of time t0, t1, and t2 is assumed.

At the point of time t0, the CPU 55 reads in a comparison result signal, and determines the current coil voltage polarity, in synchronization with the falling edge of a waveform-shaped crank signal.

In the example of FIGS. 4A and 4B, since the comparison result signal has a high-level at the point of time to, the polarity determination result becomes a positive polarity.

Similarly, since the comparison result signal has a high level at point of time t1, the polarity determination result becomes a positive polarity.

On the other hand, since the comparison result signal transits to a low level at the point of time t2, the polarity determination result becomes a negative polarity.

That is, in a period in which failures (short-circuiting, disconnection, etc.) do not occur in the reverse rotation detecting coil 30f, but the engine 1 normally makes forward rotation, whenever waveform-shaped crank signals are input three times, i.e., whenever the crankshaft 13 (rotor 30a) rotates 60°, the coil voltage polarity cycle including "positive polarity", "positive polarity", and "negative polarity" in order in one cycle is obtained.

The CPU 55 updates the above coil voltage polarity cycle on the basis of the determination result of the current coil voltage polarity in Step S6 in synchronization with the falling edge of a waveform-shaped crank signal.

Referring back to FIG. 5, the CPU 55 proceeds to the reverse rotation/failure detection processing that is a subroutine after Step S6 (Step S7).

Figure 6:
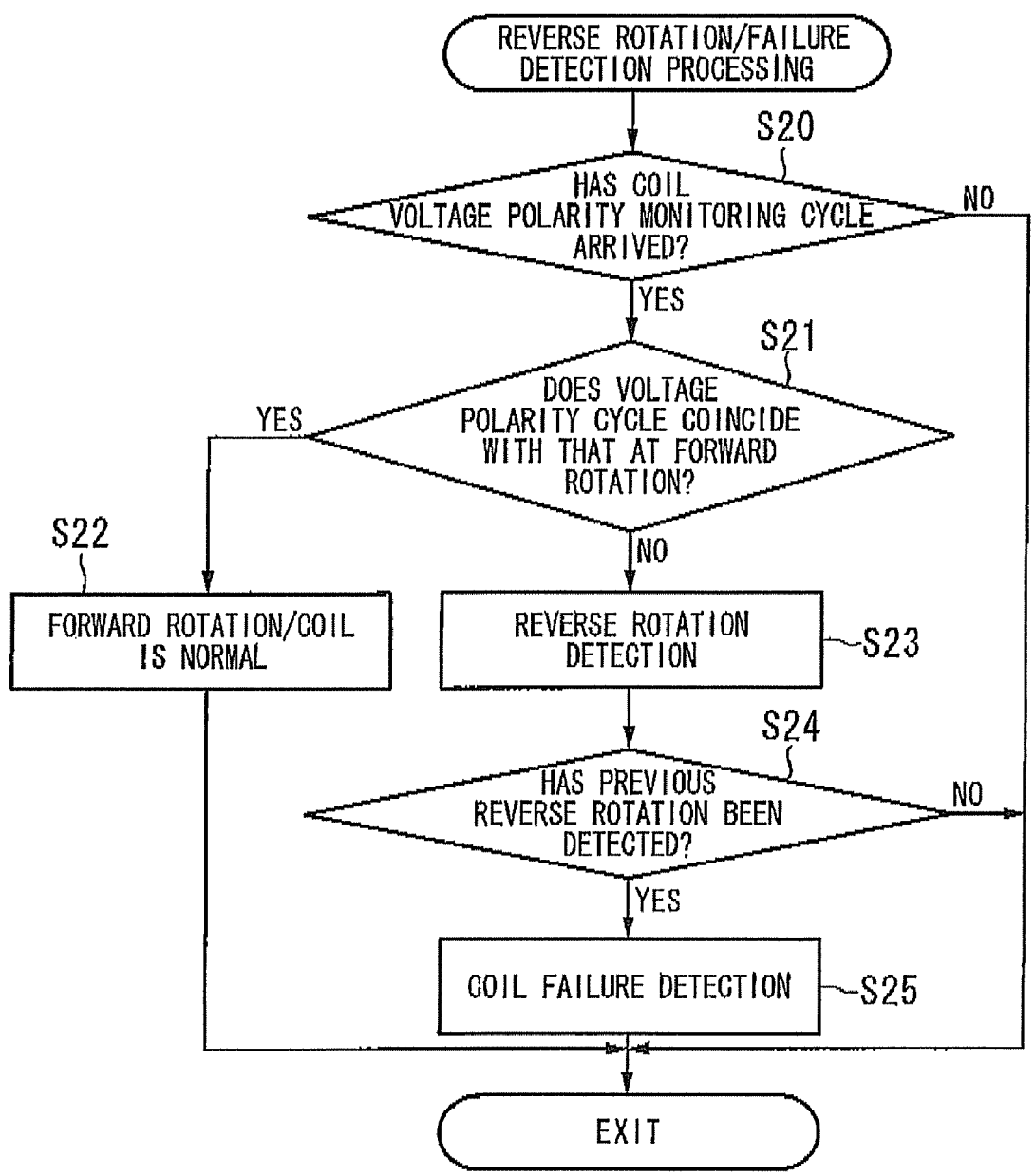
FIG. 6 is a flowchart view relating to the operation of the control apparatus for an internal combustion engine (ECU 4) according to the first embodiment of the invention.

FIG. 6 is an operation flowchart of reverse rotation/failure detection processing.

As shown in FIG. 6, if the CPU 55 proceeds to the reverse rotation/failure detection processing, first, the CPU determines whether or not the coil voltage polarity monitoring cycle has arrived, i.e., whether or not waveform-shaped crank signals are input three times, and the crankshaft 13 has rotated 60° (Step S20).

If, in this Step S20, the coil voltage polarity monitoring cycle has not arrived ("NO") (i.e., if the crankshaft 13 has not rotated 60°), the CPU 55 completes the reverse rotation/failure detection processing, and proceeds to Step S8 in the reverse rotation prevention processing of FIG. 5.

On the other hand, if, in Step S20, the coil voltage polarity monitoring cycle has arrived ("YES") (i.e., if the crankshaft 13 has rotated 60°), the CPU 55 determines whether or not the coil voltage polarity cycle coincides with a cycle at the time of forward rotation (Step S21).

If, in this Step S21, the coil voltage polarity cycle coincides with the cycle at the time of forward rotation, that is, if the coil voltage polarity cycle includes "positive polarity", "positive polarity", and "negative polarity" ("YES") in order in one cycle as described above, the CPU 55 determines that there is no failure of the forward rotation and reverse rotation detecting coil 30f (Step S22), and then, completes the reverse rotation/failure detection processing, and proceeds to Step S8 in the reverse rotation prevention processing of FIG. 5.

On the other hand, if, in Step S21, the coil voltage polarity cycle does not coincide with the cycle at the time of forward rotation, i.e., if the coil voltage polarity cycle is different from the coil voltage polarity cycle including "Positive polarity", "positive polarity", and "negative polarity" in order as described above ("NO"), the CPU 55 determines that the engine 1 is in a reverse rotation state (Step S23), and determines whether or not the reverse rotation detection has been finished in a previous coil voltage polarity monitoring cycle (Step S24).

If, in this Step S24, the reverse rotation detection has not been finished in the previous coil voltage polarity monitoring cycle ("NO"), the CPU 55 completes the reverse rotation/failure detection processing, and proceeds to Step S8 in the reverse rotation prevention processing of FIG. 5.

If, in this Step S24, the reverse rotation detection has been finished in the previous coil voltage polarity monitoring cycle ("YES"), the CPU 55 determines that a failure has occurred in the reverse rotation detecting coil 30f (Step S25), and then, completes the reverse rotation/failure detection processing, and proceeds to Step S8 in the reverse rotation prevention processing of FIG. 5.

Hereinafter, the processing of above Steps S21, S23, S24, and S25 will be specifically described.

As shown in FIGS. 4A and 4B, a case where a failure, such short-circuiting or disconnection, has occurred in the reverse rotation detecting coil 30f at a point of time t3, and the level of alternating voltage signals output from the reverse rotation detecting coil 30f has become constant at a ground level (0 V) after the point of time t3 is assumed.

That is, comparison result signals become constant at a high level after the point of time t3.

In such a situation, the coil voltage polarity cycle includes "positive polarity" □ "positive polarity" at the points of time t4 to t5 before a point of time t6. However, at the detection of a falling edge of a waveform-shaped crank signal at the point of time t6. The polarity that normally becomes "negative polarity" becomes "positive polarity" and consequently, the coil voltage polarity cycle does not coincide with the cycle at the time of forward rotation. Therefore, the CPU 55 determines that the engine 1 is in a reverse rotation state.

In addition, at this time, it cannot be determined whether the reason why the coil voltage polarity cycle does not coincide with the cycle at the time of forward rotation is caused by the reverse rotation, or is caused by a failure of the reverse rotation detecting coil 30f. Therefore, if non-coincidence of initial coil voltage polarity cycles is detected, it is determined that reverse rotation has been generated (processing of Step S21 and S23).

Then, similarly, if the coil voltage polarity cycle does not coincide with the cycle at the time of forward rotation after a point of time t9, reverse rotation detection is finished in the previous coil voltage polarity monitoring cycles (t4 to t6). Therefore, the CPU 55 determines that a failure has occurred in the reverse rotation detecting coil 30f (processing of Step S24 and S25).

As described above, if non-coincidence of the coil voltage polarity cycles continuously occurs multiple times (two times in the first embodiment), the possibility that a failure, such as short-circuiting or disconnection occurs in the reverse rotation detecting coil 30f is high. Thus, at this point, it is determined that a failure has occurred in the reverse rotation detecting coil 30f.

In addition, in the first embodiment, if non-coincidence of the coil voltage polarity cycles has continuously occurred twice, the CPU 55 determines that a failure has occurred in the reverse rotation detecting coil 30f. Also, if non-coincidence of the coil voltage polarity cycles continuously occurs twice or more, the CPU 55 may determine that a failure has occurred in the reverse rotation detecting coil 30f.

The above description is about the reverse rotation/failure detection processing. In Step S7 in FIG. 5, the CPU 55 proceeds to ignition output processing that is a subroutine after completing the subroutine of the above reverse rotation/failure detection processing (Step S8).

Figure 7:
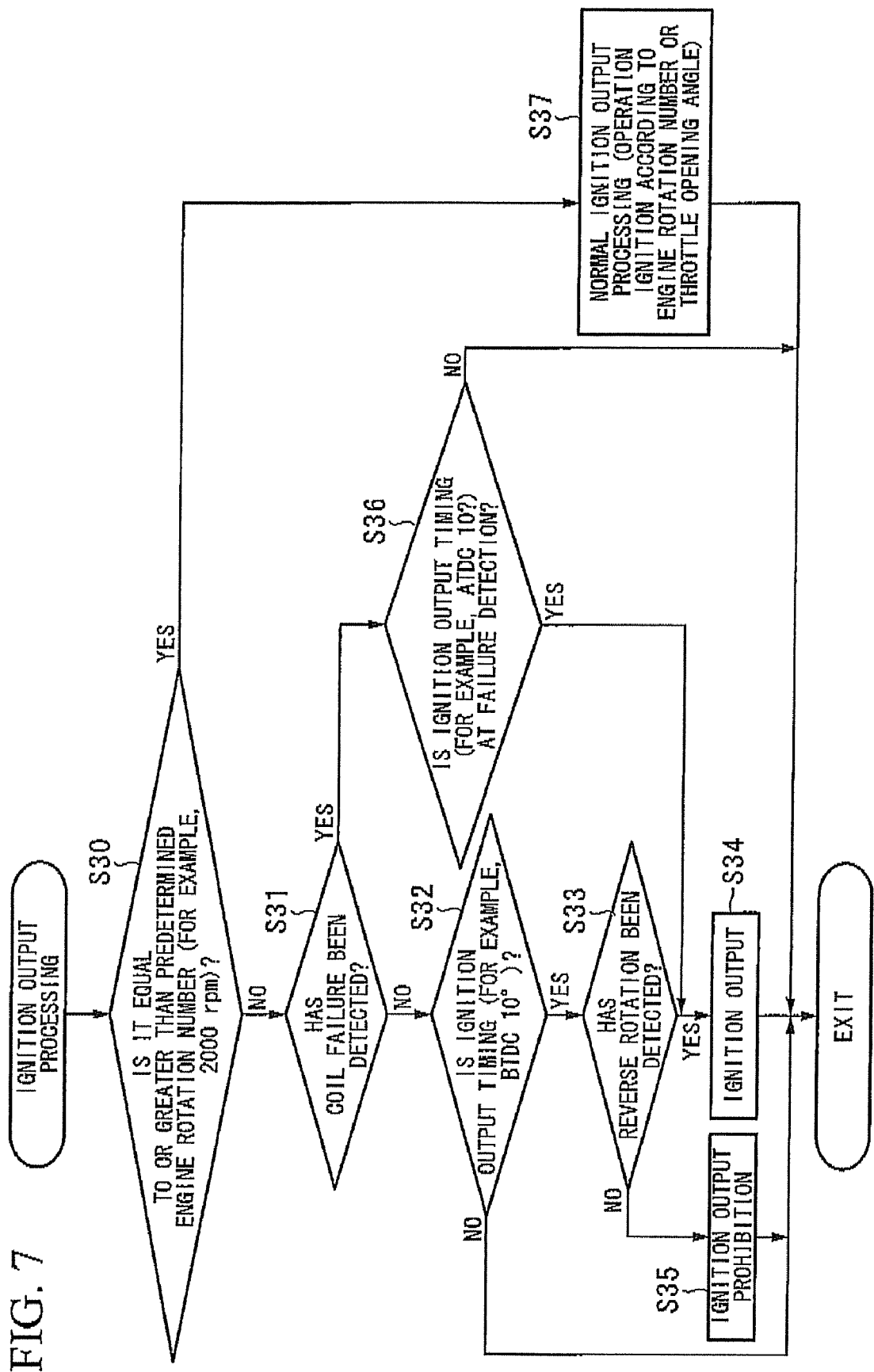
FIG. 7 is a flowchart view relating to the operation of the control apparatus for an internal combustion engine (ECU 4) according to the first embodiment of the invention.

FIG. 7 is an operation flowchart of the ignition output processing.

As shown in FIG. 7, if the CPU 55 proceeds to the ignition output processing, first, the CPU determines whether or not the engine rotation number is greater than or equal to a predetermined value (for example, 2000 rpm) (Step S30).

If, in this Step S30, the engine rotation number is less than a predetermined value ("NO"), the engine 1 may make reverse rotation and rebounding of kick pedal may occur. Therefore, the CPU 55 determines whether or not the detection of the failure occurrence of the reverse rotation detecting coil 30f has been finished in the reverse rotation/failure detection processing (Step S31).

If, in this Step S31, the detection of the failure occurrence of the reverse rotation detecting coil 30f has not been finished ("NO"), the CPU 55 determines whether or not the ignition timing has arrived on the basis of a waveform-shaped crank signal, or (whether or not the crank angle reference position BTDC has been detected) (Step S32).

As shown in FIGS. 4A and 4B, in the crank angle reference position, the crank angle reference projection $30a_1$ which has a large width passes through the crank angle sensor 27. Therefore, a rectangular wave pulse signal having a long high-level period is generated.

If the falling edge of this rectangular wave pulse signal having a long high-level period has not been detected (point of time t10 in FIGS. 4A and 4B), it is possible to determine that the crank angle reference position has been detected (i.e., that the ignition timing has arrived).

The CPU 55 performs the processing of detecting the crank angle reference position in parallel on the basis of the waveform-shaped crank signal, as described above, other than the reverse rotation prevention processing.

If, in Step S32, the ignition timing has not arrived (i.e., if the crank angle reference position is not detected) ("NO"), the CPU 55 completes the ignition output processing, and proceeds to Step S1 in the reverse rotation prevention processing of FIG. 5.

On the other hand, if, in Step S32, the ignition timing has arrived (i.e., if the crank angle reference position has been detected) ("YES"), the CPU 55 determines whether or not detection of the reverse rotation of the engine 1 has been finished in the reverse rotation/failure detection processing (Step S33).

If, in Step S33, the detection of the reverse rotation of the engine 1 is not finished ("NO"), i.e., if the engine 1 normally makes forward rotation, the CPU 55, as shown in FIGS. 4A and 4B, outputs an ignition control signal for making the ignition plug 16 spark to the ignition circuit 56 (Step S34).

On the other hand, if, in Step S33, the detection of the reverse rotation of the engine 1 has been finished ("YES"), i.e., if it is determined that the engine 1 makes reverse rotation, the CPU 55 prohibits ignition output, i.e., the output of an ignition control signal (Step S35).

In the case where the detection of the reverse rotation has been finished in this way, occurrence of rebounding of kick pedal can be prevented by prohibiting ignition output.

In addition, the CPU 55 completes the ignition output processing after Steps S34 and S35, and proceeds to Step S1 in the reverse rotation prevention processing of FIG. 5.

Furthermore, if, in Step S31, the detection of the failure occurrence of the reverse rotation detecting coil 30f has been finished ("YES"), the CPU 55 determines a crank angle reference position at a failure corresponding to the ignition timing at failure detection has been detected (Step S36).

Specifically, the CPU 55 detects as the crank angle reference position at a failure a case where a rear end of the auxiliary projection 30a2 provided behind the crank angle reference projection 30a$_1$ has passed through the crank angle sensor 27, and as shown in FIGS. 4A and 4B, the falling edge of a waveform-shaped crank signal has been detected at a point of time t11.

If, in the above Step S36, the crank angle reference position at a failure has been detected ("YES"), the CPU 55 proceeds to the processing of Step S34, and as shown in FIGS. 4A and 4B, outputs an ignition control signal for making the ignition plug 16 spark to the ignition circuit 56.

On the other hand, if, in Step S36, the crank angle reference position at a failure has not been detected ("NO"), the CPU 55 completes the ignition output processing, and proceeds to Step S1 in the reverse rotation prevention processing of FIG. 5.

As described above, at the time of occurrence of a failure of the reverse rotation detecting coil 30f, the ignition output is not stopped like at the time of the detection of reverse rotation, but the ignition output is performed with ignition timing (crank angle reference position at a failure) at failure detection, which is later than normal ignition timing (crank angle reference position). As a result, occurrence of rebounding of kick pedal can be prevented, and disabled engine startup, or if the engine is under operation, occurrence of an engine stall can be prevented.

Furthermore, if, in Step S30, the engine rotation number is greater than or equal to a predetermined value ("YES"), the reverse rotation of the engine 1 may no longer rotate reversely. The CPU 55 performs the normal ignition output processing (Step S37), and then, completes the ignition output processing, and proceeds to Step S1 in the reverse rotation prevention processing of FIG. 5.

As the normal ignition output processing, the CPU 55 calculates ignition timing according to an engine rotation number and a throttle opening angle and outputs an ignition control signal for making the ignition plug 16 spark with this ignition timing to the ignition circuit 56.

The above description is about the ignition output processing. Referring back to FIG. 5, if, in Step S1, a waveform-shaped crank signal is not input ("NO"), the CPU 55 controls the timer 61, and determines whether or not there is no input of a waveform-shaped crank signal within a predetermined time (an engine stall) (Step S9).

If, in this Step S9, there is any input of a waveform-shaped crank signal within a predetermined time, i.e., if there is no engine stall ("NO"), the CPU 55 returns to the processing of Step S1, while if there is no input of a waveform-shaped crank signal within a predetermined time ("YES") (i.e., if it is determined to be an engine stall), the CPU resets a reverse rotation detecting state, and returns to the processing of Step S1 (Step S10).

As described above, according to the first embodiment, occurrence of a failure, such as short-circuiting or disconnection, in the reverse rotation detecting coil 30f for detection of reverse rotation, can be detected, and if the engine is under operation, the ignition output can be permitted, and consequently, occurrence of an engine stall can be prevented.

Furthermore, engine startup can be enabled after failure detection.

Moreover, by performing the ignition output with ignition timing at failure detection that is later than the normal ignition timing (crank angle reference position) after the failure detection, rebounding of kick pedal can be prevented, and engine startup can be enabled.

In addition, when a failure has been detected, a function to control on/off of an alarm device (notification unit), such as a lamp provided in an external gauge board (so-called instrument panel), and to notify a user of a failure of the reverse rotation detecting coil 30f may be given to the CPU 55.

Conventionally, even if shutdown or disabled startup has occurred at the time of occurrence of a failure, a user would not know the cause of the shutdown. However, troubleshooting becomes easy by providing a function to notify the user that a failure has been detected in this way.

Furthermore, in the above first embodiment, the reverse rotation detecting coil 30f exclusive for detection of reverse rotation is provided in the generator 30. However, the invention is not limited thereto. A magnet-type AC generator that rotates in synchronization with the crankshaft 13 and outputs one-phase alternating voltage signals may be provided in addition to the generator 30, and an exciter coil may be used as the reverse rotation detecting coil 30f.

Next, a second embodiment of the present invention will be described.

In the second embodiment, the reverse rotation prevention processing of the ECU 4 (in particular, of the CPU 55) during the operation of the engine 1 in the engine control system that is provided with the ECU 4 (i.e., the control apparatus for an internal combustion engine) that is constructed in the manner described above will be described.

Specifically, the reverse rotation prevention processing in the second embodiment is performed in synchronization with the engine 1, i.e., in synchronization with the rotation of the crankshaft 13 based on a crank signal.

In addition, in the following second embodiment, the same components as those of the above first embodiment are denoted by the same reference numerals, and the description thereof is omitted.

Figure 8A:
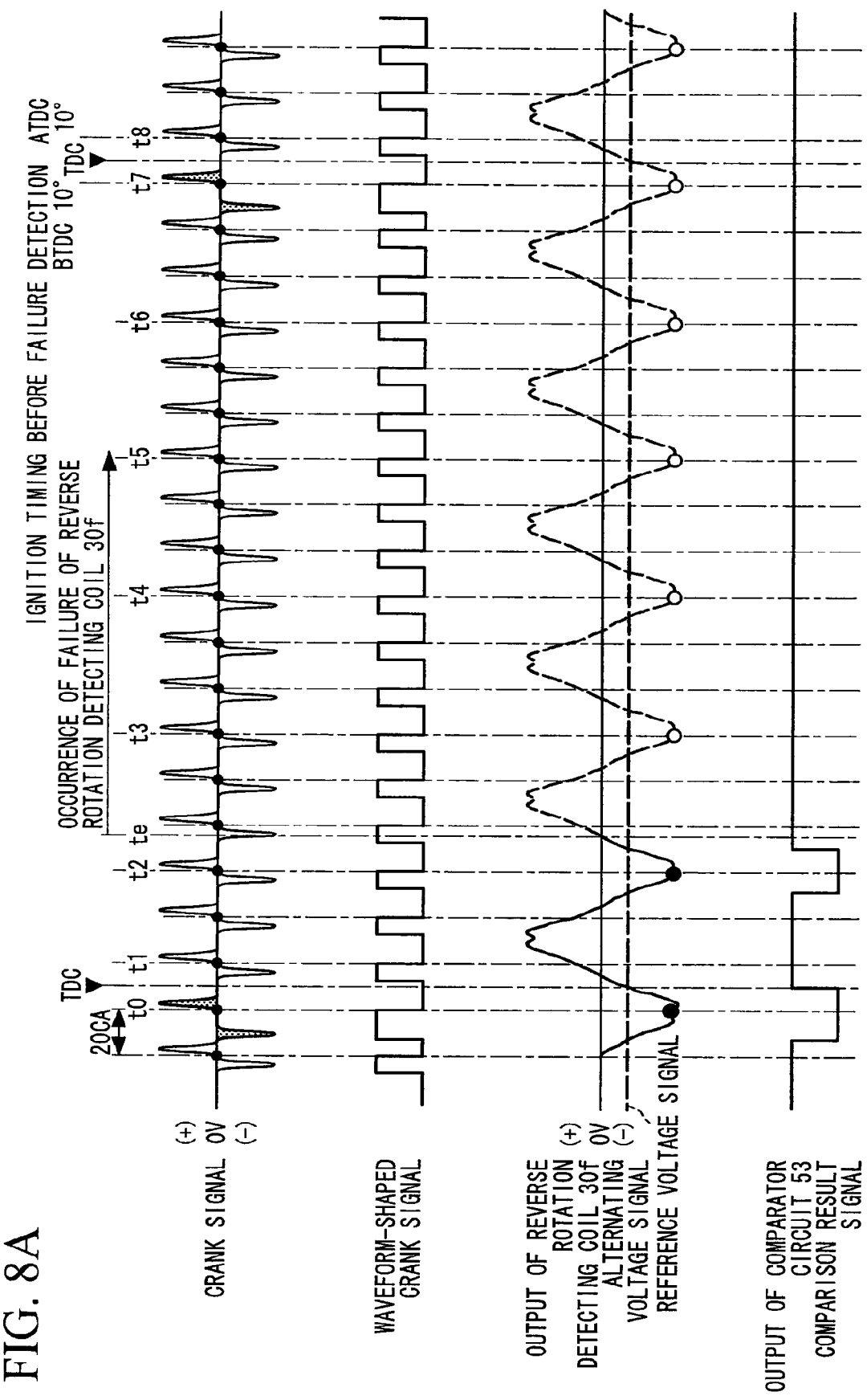
FIGS. 8A and 8B are explanatory diagrams relating to the operation of a control apparatus for an internal combustion engine (ECU 4) according to a second embodiment of the invention.
Figure 8B:
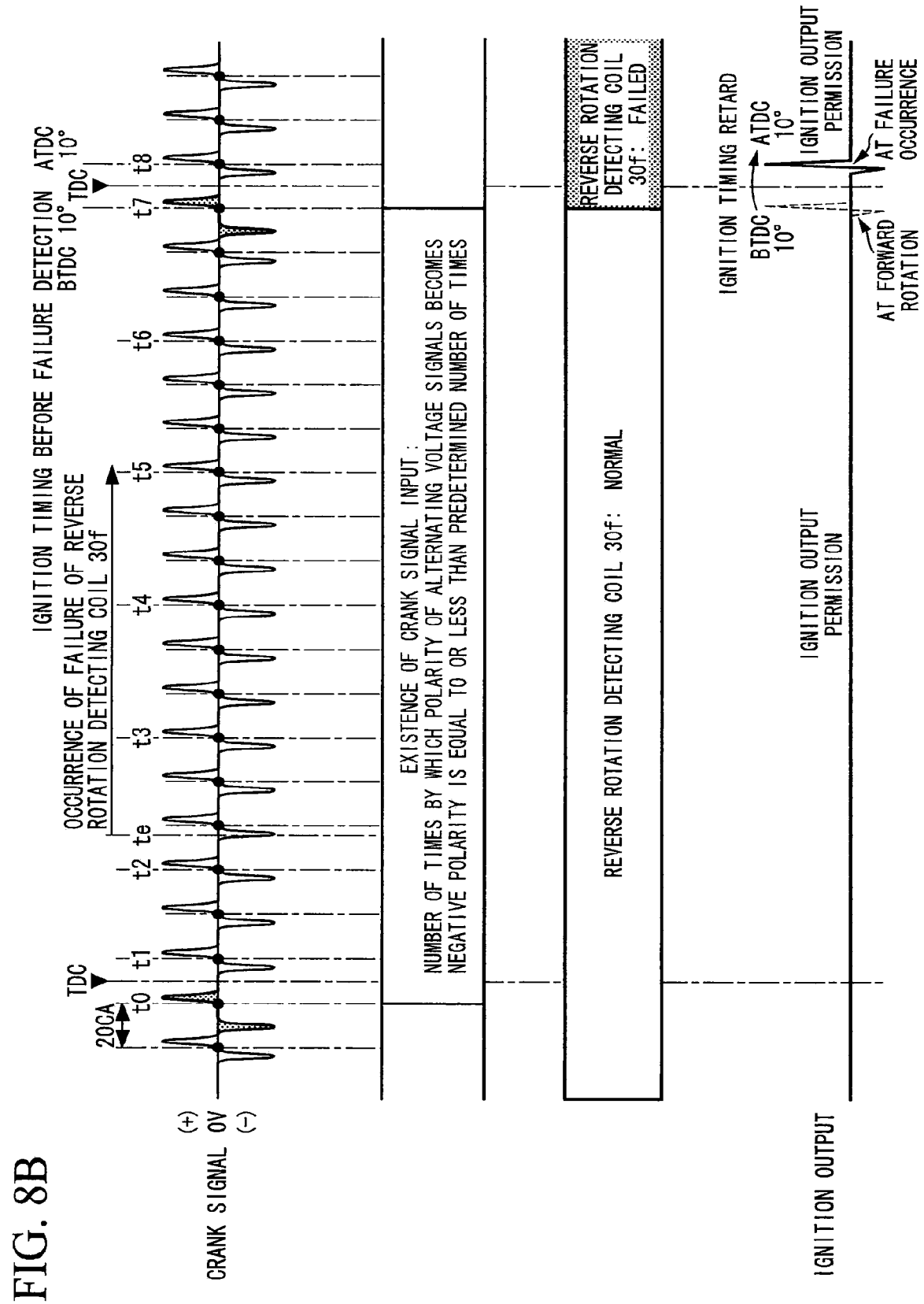

FIGS. 8A and 8B are timing charts showing the correspondence relationship among crank signals output from the crank angle sensor 27, waveform-shaped crank signals output from the waveform shaping circuit 50, alternating voltage signals output from the reverse rotation detecting coil 30f, reference voltage signals output from the reference voltage source 52, and comparison result signals output from the comparator circuit 53.

As shown in FIGS. 8A and 8B, during the operation of the engine 1, the rotor 30a also rotates in synchronization with the rotation of the crankshaft 13, and the crank angle sensor 27 outputs pulsed crank signals having a negative-polarity amplitude when the front end of each projection passes therethrough in the rotational direction, and outputs pulsed crank signals having a positive-polarity amplitude when the rear end of each projection passes therethrough in the rotational direction.

Furthermore, the waveform shaping circuit 50 outputs crank signals (square-wave pulse signals) the waveform of which has been shaped such that negative-polarity crank signals have a high level, and positive-polarity and ground-level crank signals have a low level.

That is, the time between falling edges of waveform-shaped crank signals is equivalent to the time which is taken for the crankshaft 13 to rotate 20°.

Furthermore, from the reverse rotation detecting coil 30f, alternating voltage signals in which the time which is taken for the rotor 30a (crankshaft 13) to rotate 60° becomes one cycle are output. From the comparator circuit 53, high-level comparison result signals are output when the voltage values of alternating voltage signals are greater than the voltage values of reference voltage signals (i.e., when the alternating voltage signals have a positive polarity), and low-level comparison result signals are output when the voltage values of the alternating voltage signals are less than the voltage values of reference voltage signals (i.e., when the alternating voltage signals have a negative polarity).

In addition, although alternating voltage signals output from the reverse rotation detecting coil 30f are shown by solid lines and broken lines in FIGS. 8A and 8B, solid line portions represent a case where a failure, such as short-circuiting or disconnection has occurred in the reverse rotation detecting coil 30f at a point of time te, and broken line portions represent a case where a failure does not occur in the reverse rotation detecting coil 30f, but an alternating voltage signal is normally output, after the point of time te.

During the operation of the engine 1, the CPU 55 performs the reverse rotation prevention processing of crank signal synchronization (engine synchronization) on the basis of the waveform-shaped crank signals and comparison result signals as described above.

Figure 9:
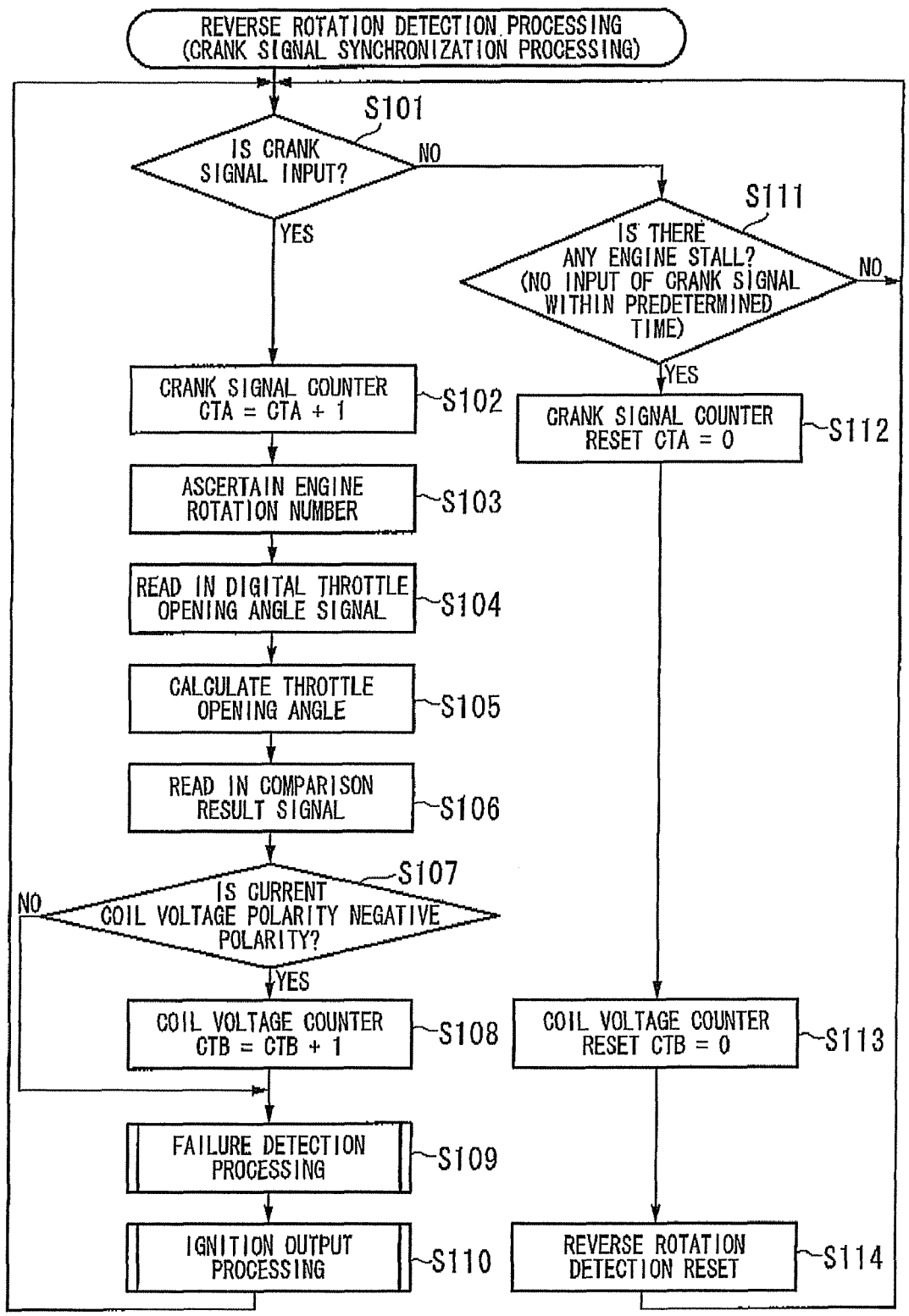
FIG. 9 is a flowchart view relating to the operation of the control apparatus for an internal combustion engine (ECU 4) according to the second embodiment of the invention.

FIG. 9 is an operation flowchart of CPU 55 relating to the reverse rotation prevention processing of engine synchronization.

As shown in FIG. 9, first, the CPU 55 determines whether or not a waveform-shaped crank signal has been input (a falling edge has been detected) (Step S101). If the waveform-shaped crank signal has been input ("YES"), the CPU makes an increment of the crank signal counter CTA (Step S102).

That is, this crank signal counter CTA is a variable showing the number of times by which falling edges of waveform-shaped crank signals have been detected.

Then, CPU 55 reads in an engine rotation number from the rotation counter 51 to ascertain the engine rotation number (Step S103).

Then, the CPU 55 reads in a digital throttle opening angle signal from the A/D converter 54 (Step S104), and calculates the throttle opening angle of the throttle valve 21 on the basis of the digital throttle opening angle signal (Step S105).

Then, the CPU 55 reads in a comparison result signal in synchronization with the falling edge of a waveform-shaped crank signal (Step S106), and determines whether or not the polarity (hereinafter referred to as a "current coil voltage polarity") of a current alternating voltage signal is a negative polarity (Step S107).

Here, if the comparison result signal has a high level, the CPU 55 determines the current coil voltage polarity to be a positive polarity, and if the comparison result signal has a low level, the CPU determines the current coil voltage polarity to be a negative polarity.

For example, as shown in FIGS. 8A and 8B, if the falling edge of a waveform-shaped crank signal is detected at the point of time t0, the CPU 55 determines that the current coil voltage polarity is a negative polarity because the comparison result signal is a low level.

On the other hand, if the falling edge of a waveform-shaped crank signal is detected at the point of time t1, the CPU 55 determines that the current coil voltage polarity is a positive polarity because the comparison result signal is a high level.

If, in the above Step S107, the current coil voltage polarity is not a negative polarity ("NO"), the CPU 55 proceeds to the processing of Step S109. On the other hand, if the current coil voltage polarity is determined to be a negative polarity ("YES"), the CPU makes an increment of the coil voltage counter CTB (Step S108).

That is, the coil voltage counter CTB (result of counting) is a variable showing the number of times by which the current coil voltage polarity is determined to be a negative polarity.

In addition, as understood from FIGS. 8A and 8B, if a failure does not occur in the reverse rotation detecting coil 30f but an alternating voltage signal is normally output, the number of times by which the current coil voltage polarity is determined to be a negative polarity while the crankshaft 13 makes one rotation becomes a total of 6 times, including points of time t2, t3, t4, t5, t6, and t7.

Subsequently, the CPU 55 proceeds to the failure detection processing of the reverse rotation detecting coil 30f, which is a subroutine after Step S108 (Step S109).

Figure 10:
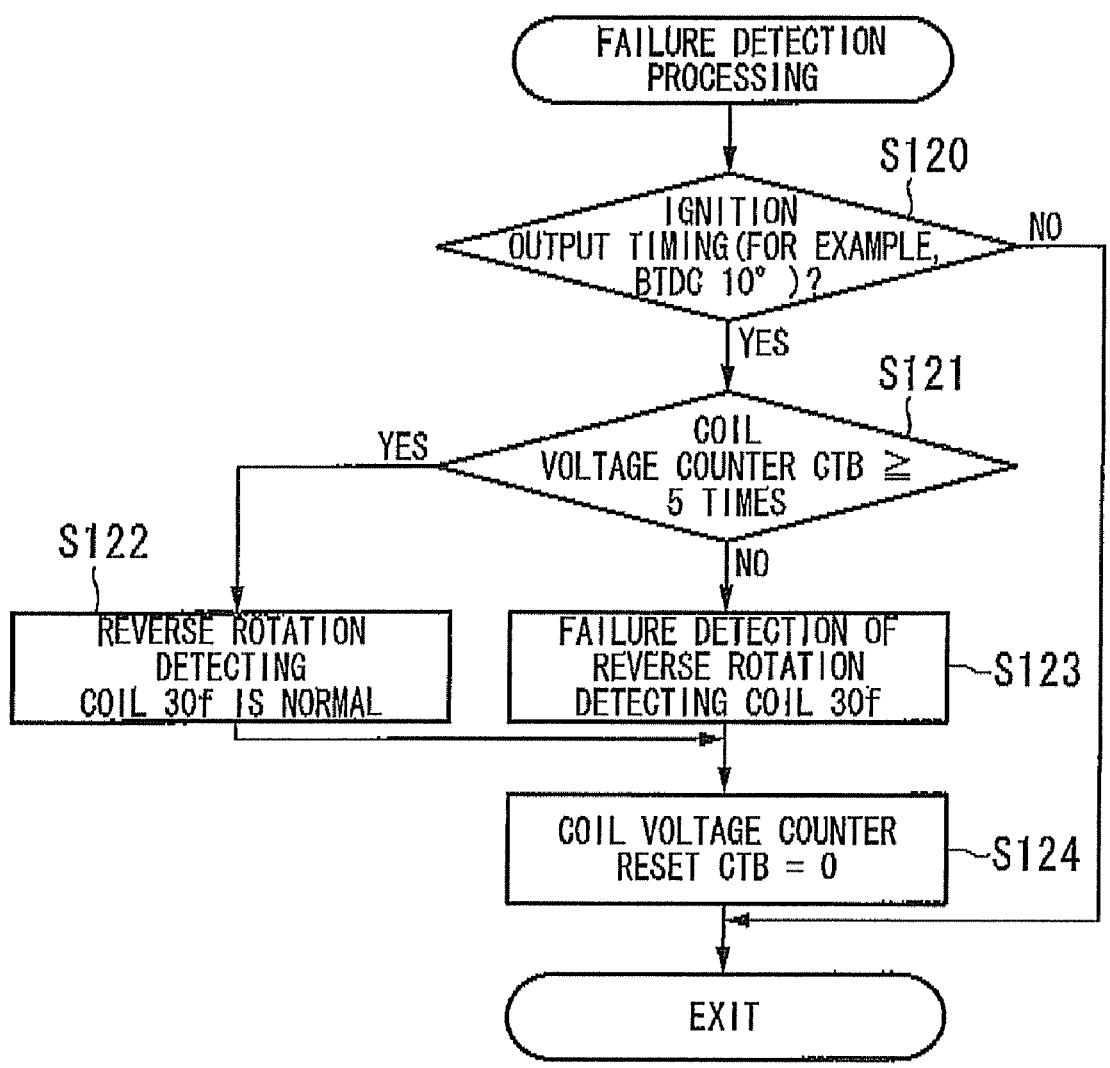
FIG. 10 is a flowchart view relating to the operation of the control apparatus for an internal combustion engine (ECU 4) according to the second embodiment of the invention.

FIG. 10 is an operation flowchart of the failure detection processing of the reverse rotation detecting coil 30f.

As shown in FIG. 10, when the CPU 55 proceeds to the failure detection processing of the reverse rotation detecting coil 30f, first, the CPU determines whether or not the ignition timing has arrived (i.e., whether or not the crank angle reference position has been detected) on the basis of the waveform-shaped cranks signal (Step S120).

As shown in FIGS. 8A and 8B, in the crank angle reference position, the crank angle reference projection $30a_2$ which has a large width passes through the crank angle sensor 27. Therefore, a rectangular wave pulse signal having a long high-level period is generated.

If the falling edge of this pulse signal having a long high-level period has not been detected (point of time t7 in FIGS. 8A and 8B), it is possible to determine that the crank angle reference position has been detected (i.e., that the ignition timing has arrived).

The CPU 55 performs the processing of detecting the crank angle reference position in parallel on the basis of the waveform-shaped crank signal, as described above, other than the reverse rotation prevention processing.

If, in Step S120, the ignition timing has not arrived (i.e., if the crank angle reference position is not detected) ("NO"), the CPU 55 completes the failure detection processing, and proceeds to Step S110 in the reverse rotation prevention processing of FIG. 9.

On the other hand, if, in Step S120, the ignition timing has arrived (i.e., if the crank angle reference position has been detected) ("YES"), the CPU 55 determines whether or not the coil voltage counter CTB is greater than or equal to 5 times (Step S121).

If, in this Step S121, the coil voltage counter CTB has been greater than or equal to 5 times ("YES"), the CPU 55 determines that there is no failure occurrence (normal) in the reverse rotation detecting coil 30f (Step S122), and proceeds to the processing of Step S124.

That is, if the coil voltage counter CTB is greater than or equal to 5 times, as understood from FIGS. 8A and 8B, an alternating voltage signal is normally output from the reverse rotation detecting coil 30f. Therefore, it is possible to determine that the reverse rotation detecting coil 30f is normal.

In addition, as described above, the number of times by which the current coil voltage polarity is determined to be a negative polarity becomes 6 times while the crankshaft 13 makes one rotation. Therefore, if the coil voltage counter CTB has been greater than or equal to 6 times, it is also considered that it is determined that the reverse rotation detecting coil 30f is normal. In this case, however, since a failure of the reverse rotation detecting coil 30f may be erroneously detected at the time of the generation of reverse rotation of the engine 1 (crankshaft 13), it is preferable to set a threshold value for comparison and determination to 5 times.

On the other hand, if, in Step S121, the coil voltage counter CTB has been less than 5 times ("NO"), the CPU 55 determines that a failure has occurred in the reverse rotation detecting coil 30f (Step S123), and proceeds to the processing of Step S124.

As understood from FIGS. 8A and 8B, if a failure, such as short-circuiting or disconnection, has occurred in the reverse rotation detecting coil 30f at a point of time te, the alternating voltage signal becomes constant at a ground level (0 V). Therefore, the number of times by which the current coil voltage polarity is determined to be a negative polarity becomes one time while the crankshaft 13 makes one rotation.

That is, it is possible to determine that the coil voltage counter CTB becomes less than 5 times, and a failure has occurred in the reverse rotation detecting coil 30f.

Then, the CPU 55 resets the coil voltage counter CTB to "0" (Step S124), and then completes the failure detection processing and proceeds to Step S110 in the reverse rotation prevention processing of FIG. 9.

The above description is about the failure detection processing of the reverse rotation detecting coil 30f. In Step S109 in FIG. 9, the CPU 55 proceeds to ignition output processing, which is a subroutine after completing the subroutine of the above failure detection processing (Step S110).

Figure 11:
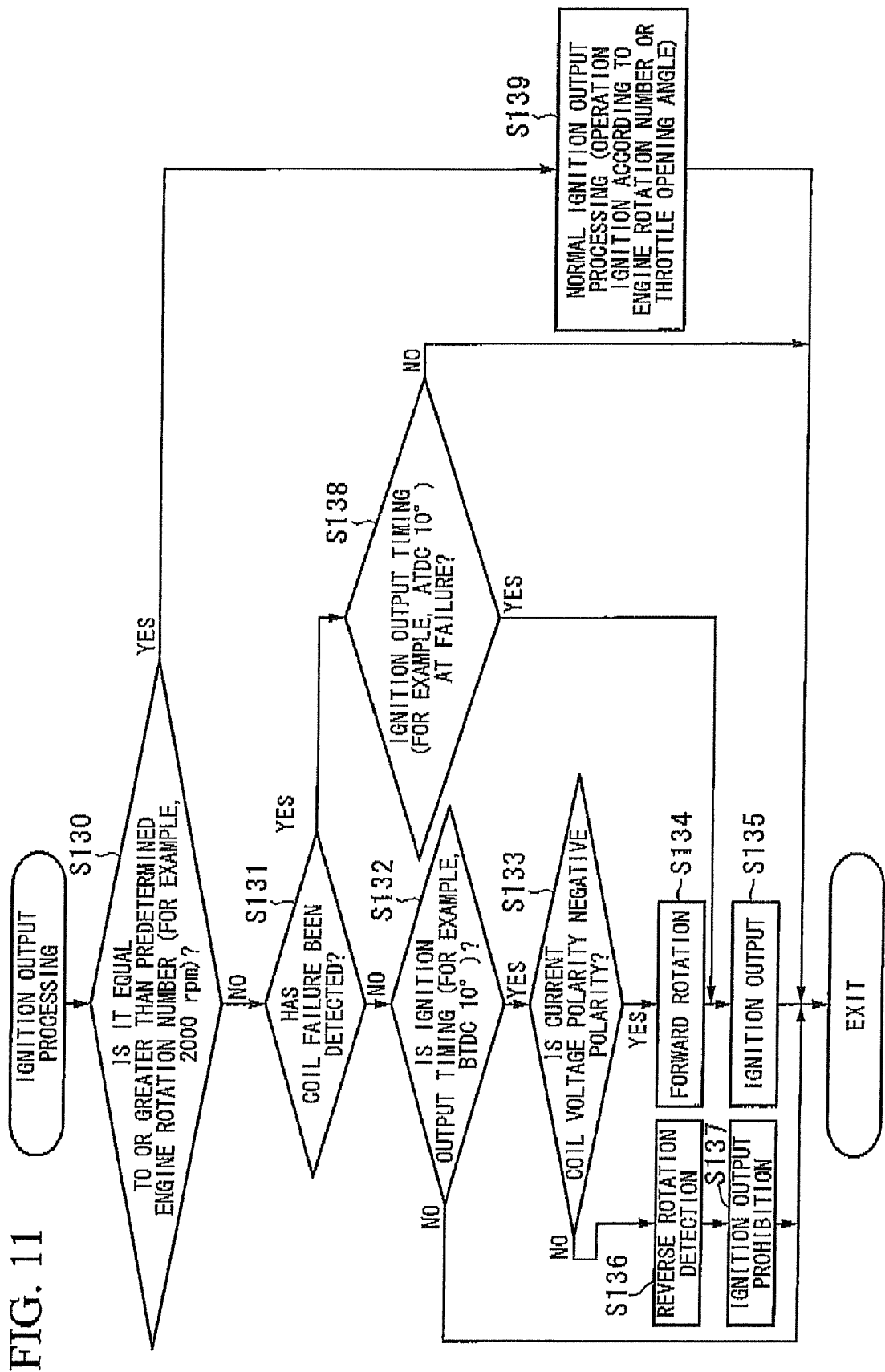
FIG. 11 is a flowchart view relating to the operation of the control apparatus for an internal combustion engine (ECU 4) according to the second embodiment of the invention.

FIG. 11 is an operation flowchart of the ignition output processing.

As shown in FIG. 11, if the CPU 55 proceeds to the ignition output processing, first, the CPU determines whether or not the engine rotation number is greater than or equal to a predetermined value (for example, 2000 rpm) (Step S130).

If, in this Step S130, the engine rotation number is less than a predetermined value ("NO"), the engine 1 may make reverse rotation and rebounding of kick pedal may occur. Therefore, the CPU 55 determines whether or not the detection of the failure occurrence of the reverse rotation detecting coil 30f has been finished in the reverse rotation/failure detection processing (Step S131).

If, in this Step S131, the detection of the failure occurrence of the reverse rotation detecting coil 30f has not been finished ("NO"), the CPU 55 determines whether or not the ignition timing has arrived on the basis of a waveform-shaped crank signal, or whether or not the crank angle reference position has been detected (Step S132).

If, in the above Step S132, the ignition timing has not arrived (i.e., if the crank angle reference position is not detected) ("NO"), the CPU 55 comes out of the ignition detection processing, and proceeds to Step S101 in the reverse rotation prevention processing of FIG. 9.

On the other hand, if, in Step S132, the ignition timing has arrived (i.e., if the crank angle reference position has been detected) ("YES"), the CPU 55 determines whether or not the current coil voltage polarity is a negative polarity in the failure detection processing (Step S133).

As shown in FIGS. 8A and 8B, if the engine 1 is in a forward rotation state at a point of time t7 when the crank angle reference position is detected, the current coil voltage polarity becomes a negative polarity.

That is, if, in Step S133, the current coil voltage polarity has been a negative polarity ("YES"), the CPU 55 determines that the engine 1 is in a forward rotation state (Step S134), and as shown in FIGS. 8A and 8B, outputs to the ignition circuit 56 an ignition control signal for making the ignition plug 16 spark according to an engine rotation number and a throttle opening angle at the point of time t7 (Step S135).

On the other hand, if, in Step S133, the current coil voltage polarity is not a negative polarity ("NO"), the CPU 55 determines that the engine 1 is in a reverse rotation state (Step S136), and prohibits ignition output, i.e., the output of an ignition control signal (Step S137).

In the case where the reverse rotation has been generated in this way, occurrence of rebounding of kick pedal can be prevented by prohibiting ignition output.

In addition, the CPU 55 completes the ignition output processing after Steps S135 and S137, and proceeds to Step S101 in the reverse rotation prevention processing of FIG. 9.

Furthermore, if, in this Step S131, the detection of the failure occurrence of the reverse rotation detecting coil 30f has been finished ("YES"), the CPU 55 determines that a crank angle reference position at a failure corresponding to the ignition timing at failure detection has been detected (Step S138).

Specifically, the CPU 55 detects as the crank angle reference position at a failure a case where a rear end of the auxiliary projection $30a_2$ provided behind the crank angle reference projection $30a_1$ has passed through the crank angle sensor 27, and as shown in FIGS. 8A and 8B, the falling edge of a waveform-shaped crank signal has been detected at a point of time t8.

If, in the above Step S138, the crank angle reference position at a failure has been detected ("YES"), the CPU 55 proceeds to the processing of Step S135, and as shown in FIGS. 8A and 8B, outputs an ignition control signal for making the ignition plug 16 spark to the ignition circuit 56 according to an engine rotation number and a throttle opening angle at the point of time t8.

On the other hand, if, in Step S138, the crank angle reference position at a failure has not been detected ("NO"), the CPU 55 completes the ignition output processing, and proceeds to Step S101 in the reverse rotation prevention processing of FIG. 9.

As described above, at the time of occurrence of a failure of the reverse rotation detecting coil 30f, the ignition output is not stopped like at the time of the detection of reverse rotation, but the ignition output is performed with ignition timing (crank angle reference position at a failure) at failure detection, which is later than normal ignition timing (crank angle reference position). As a result, occurrence of rebounding of kick pedal can be prevented, and disabled engine startup, or if the engine is under operation, occurrence of an engine stall can be prevented.

Furthermore, if, in Step S130, the engine rotation number is greater than or equal to a predetermined value ("YES"), the reverse rotation of the engine 1 may no longer rotate reversely. The CPU 55 performs the normal ignition output processing (Step S139), and then, completes the ignition output processing and proceeds to Step S101 in the reverse rotation prevention processing of FIG. 9.

Specifically, as the normal ignition output processing, the CPU 55 calculates ignition timing according to an engine rotation number and a throttle opening angle, and outputs an ignition control signal for making the ignition plug 16 spark with this ignition timing to the ignition circuit 56.

The above description is about the ignition output processing. Referring back to FIG. 9, if, in Step S101, a waveform-shaped crank signal is not input ("NO"), the CPU 55 controls the timer 61, and determines whether or not there is no input of a waveform-shaped crank signal within a predetermined time (an engine stall) (Step S111).

If there is any input of a waveform-shaped crank signal within a predetermined time in this Step S111, i.e., if there is no engine stall ("NO"), the CPU 55 returns to the processing of Step S101.

On the other hand, if, in Step S111, there is no input of a waveform-shaped crank signal within a predetermined time ("YES") (i.e., if it is determined to be an engine stall), the CPU 55 resets the crank signal counter CTA to "0" (Step S112), resets the coil voltage counter CTB to "0" (Step S113), and resets the reverse rotation detecting state to return to the processing of Step S101 (Step S114).

As described above, according to the second embodiment, occurrence of a failure, such as short-circuiting or disconnection, in the reverse rotation detecting coil 30f, can be detected, and if the engine is under operation, the ignition output can be permitted, and consequently, occurrence of an engine stall can be prevented.

Moreover, by performing the ignition output with ignition timing at failure detection (crank angle reference position at a failure) that is later than the normal ignition timing (crank angle reference position) after the failure detection, rebounding of kick pedal can be prevented, and engine startup can be enabled.

Next, a third embodiment of the invention will be described.

The reverse rotation prevention processing in the third embodiment is performed asynchronously with the engine 1, i.e., on the basis of an intake pressure signal output from the intake pressure sensor 23.

In addition, in the following third embodiment, the same components as those of the above first and second embodiments are denoted by the same reference numerals, and the description thereof is omitted.

Figure 12:
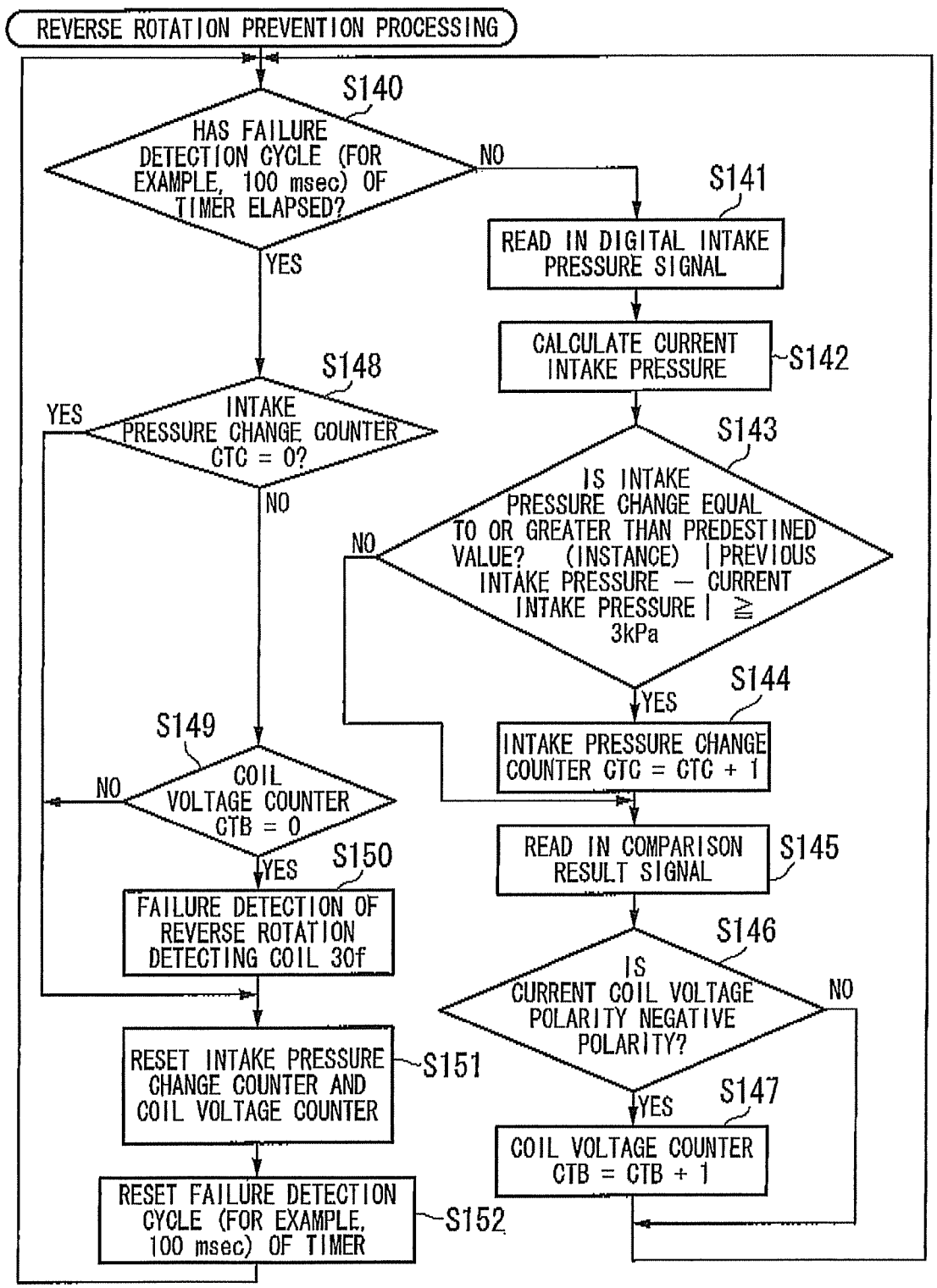
FIG. 12 is a flowchart view relating to the operation of a control apparatus for an internal combustion engine (ECU 4) according to a third embodiment of the invention.

FIG. 12 is an operation flowchart of the CPU 55 relating to the reverse rotation prevention processing of the third embodiment.

As shown in FIG. 12, first, the CPU 55 controls the timer 61 to determine whether or not a failure detection cycle (for example, 100 msec) has elapsed (Step S140).

If, in this Step S140, the failure detection cycle has not elapsed ("NO"), the CPU 55 reads in a digital intake pressure signal from the A/D converter 54 (Step S141), and calculates a current intake pressure on the basis of the digital intake pressure signal (Step S142).

Then, the CPU 55 determines whether or not a difference (i.e., intake pressure change) between a previous intake pressure and the current intake pressure is greater than or equal to a predetermined value (for example, 3 kPa) (Step S143).

If, in Step S143, the difference between the previous intake pressure and the current intake pressure is greater than or equal to 3 kPa ("YES"), the CPU 55 makes an increment of the intake pressure change counter CTC (Step S144).

That is, the intake pressure change counter CTC is a variable showing the number of times by which the difference between the previous intake pressure and the current intake pressure has been greater than or equal to 3 kPa.

On the other hand, if, in Step S143, the difference between the previous intake pressure and the current intake pressure is less than 3 kPa ("NO"), the CPU 55 proceeds to the processing of Step S145.

Subsequently, the CPU 55 reads in a comparison result signal (Step S145), and determines whether or not the current coil voltage polarity is a negative polarity (Step S146).

Here, if the comparison result signal has a high level, the CPU 55 determines the current coil voltage polarity to be a positive polarity, and if the comparison result signal has a low level, the CPU determines the current coil voltage polarity to be a negative polarity.

If, in Step S146, the current coil voltage polarity is not a negative polarity ("NO"), the CPU 55 proceeds to the processing of Step S140. On the other hand, if the current coil voltage polarity is determined to be a negative polarity ("YES"), the CPU makes an increment of the coil voltage counter CTB (Step S147), and returns to the processing of Step S140.

On the other hand, if, in Step S140, the failure detection cycle has elapsed ("YES"), the CPU 55 determines whether or not the intake pressure change counter CTC is "0" (Step S148).

If, in this Step S148, the intake pressure change counter CTC is not "0", i.e., if the intake pressure change that is greater than or equal to 3 kPa has occurred ("NO"), it is possible to determine that the engine 1 is rotating. Therefore, the CPU 55 determines whether or not the coil voltage counter CTB is "0" (Step S149).

On the other hand, in the case of the intake pressure change counter CTC=0 ("YES") in Step S148, the CPU 55 proceeds to the processing of Step S151.

In the case of the coil voltage counter CTB=0 ("YES") in Step S149, i.e., if a negative polarity is not generated in an alternating voltage signal irrespective of the fact that the engine 1 is rotating, the CPU 55 determines that a failure has occurred in the reverse rotation detecting coil 30f (Step S150).

On the other hand, if, in Step S149, the coil voltage counter CTB is not "0" ("NO"), i.e., if the engine 1 is rotating and a negative polarity is generated in an alternating voltage signal, it is possible to determine that the reverse rotation detecting coil 30f is normal. Therefore, the CPU 55 proceeds to the processing of Step S151.

Then, the CPU 55 resets the intake pressure change counter CTC and the coil voltage counter CTB to "0" (Step S151), and controls the timer 61 to perform the timer setting of the failure detection cycle, and then returns to the processing of Step S140 (Step S152).

As described above, even by the reverse rotation prevention processing of the third embodiment, occurrence of a failure, such as short-circuiting or disconnection, in the reverse rotation detecting coil 30f, can be detected. Furthermore, by performing the same ignition output processing as that in FIG. 11, if the engine is under operation, the ignition output can be permitted, and consequently, occurrence of an engine stall can be prevented.

Moreover, by performing the ignition output with ignition timing at failure detection (crank angle reference position at a failure) that is later than the normal ignition timing (crank angle reference position) after the failure detection, rebounding of kick pedal can be prevented, and engine startup can be enabled.

Next, a fourth embodiment of the invention will be described.

The reverse rotation prevention processing in the fourth embodiment is performed on the basis of both a crank signal and an intake pressure signal.

In addition, in the following fourth embodiment, the same components as those of the above first to third embodiments are denoted by the same reference numerals, and the description thereof is omitted.

Next, the reverse rotation prevention processing of the fourth embodiment performed on the basis of an intake pressure signal and a crank signal will be described.

Figure 13:
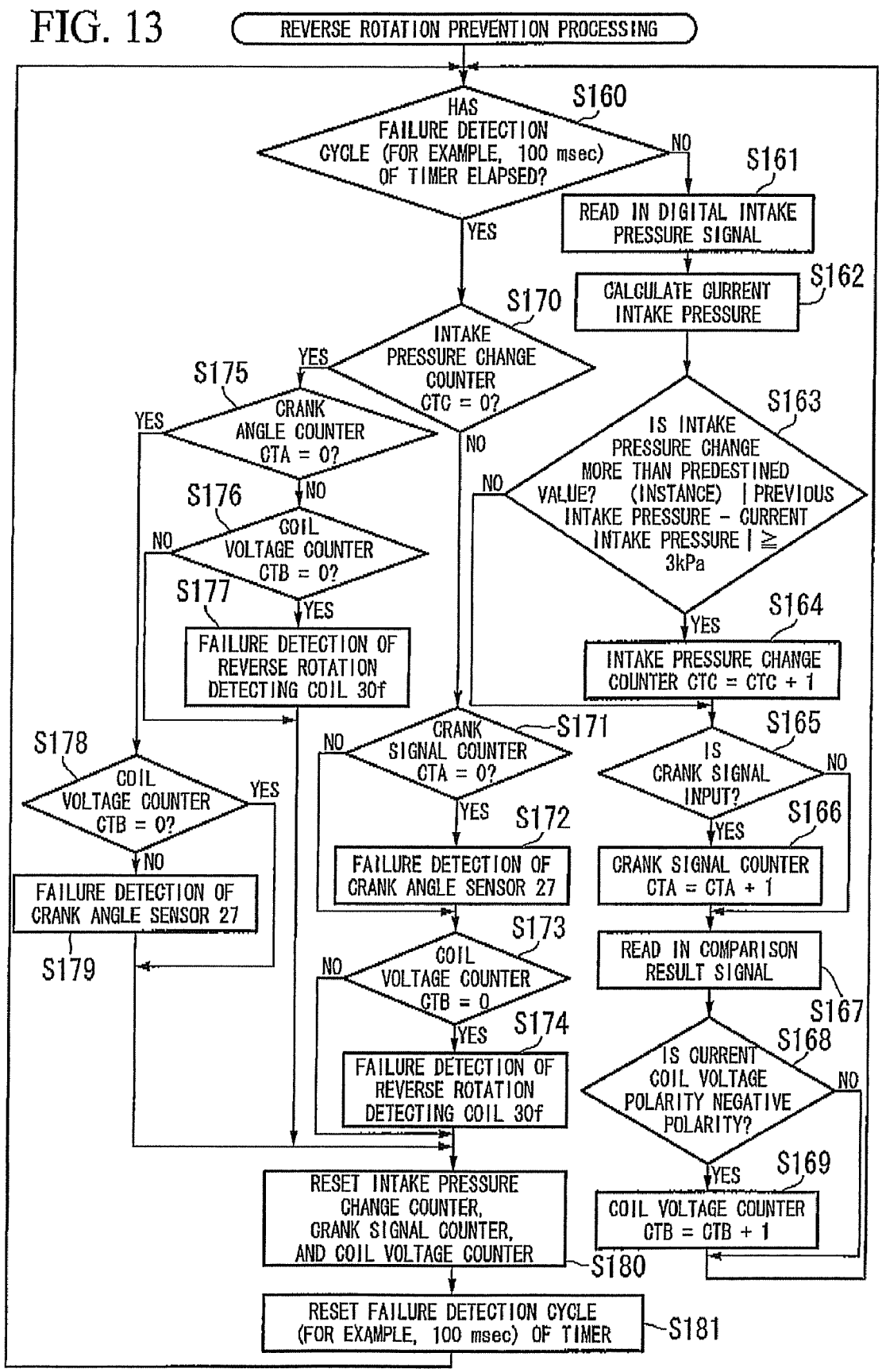
FIG. 13 is a flowchart view relating to the operation of a control apparatus for an internal combustion engine (ECU 4) according to a fourth embodiment of the invention.

FIG. 13 is an operation flowchart of the CPU 55 relating to the reverse rotation prevention processing of the fourth embodiment.

As shown in FIG. 13, first, the CPU 55 controls the timer 61 to determine whether or not a failure detection cycle (for example, 100 msec) has elapsed (Step S160).

If, in this Step S160, the failure detection cycle has not elapsed ("NO"), the CPU 55 reads in a digital intake pressure signal from the A/D converter 54 (Step S161), and calculates a current intake pressure on the basis of the digital intake pressure signal (Step S162).

Then, the CPU 55 determines whether or not a difference (i.e., intake pressure change) between a previous intake pressure and the current intake pressure is greater than or equal to a predetermined value (for example, 3 kPa) (Step S163).

If, in Step S163, the difference between the previous intake pressure and the current intake pressure is greater than or equal to 3 kPa ("YES"), the CPU 55 makes an increment of the intake pressure change counter CTC (Step S164).

On the other hand, if, in Step S163, the difference between the previous intake pressure and the current intake pressure is less than 3 kPa ("NO"), the CPU 55 proceeds to the processing of Step S165.

Subsequently, the CPU 55 determines whether or not a waveform-shaped crank signal has been input (a falling edge has been detected) (Step S165). If the waveform-shaped crank signal has been input ("YES"), the CPU makes an increment of the crank signal counter CTA (Step S166). On the other hand, if no waveform-shaped crank signal is input ("NO"), the CPU proceeds to the processing of Step S167.

Then, the CPU 55 reads in a comparison result signal (Step S167), and determines whether or not the current coil voltage polarity is a negative polarity (Step S168).

Here, if the comparison result signal has a high level, the CPU 55 determines the current coil voltage polarity to be a positive polarity, and if the comparison result signal has a low level, the CPU determines the current coil voltage polarity to be a negative polarity.

If, in this Step S168, the current coil voltage polarity is not a negative polarity ("NO"), the CPU 55 proceeds to the processing of Step S160. On the other hand, if the current coil voltage polarity is determined to be a negative polarity ("YES"), the CPU makes an increment of the coil voltage counter CTB (Step S169), and returns to the processing of Step S160.

Furthermore, if, in Step S160, the failure detection cycle has elapsed ("YES"), the CPU 55 determines whether or not the intake pressure change counter CTC is "0" (Step S170).

If, in this Step S170, the intake pressure change counter CTC is not "0", i.e., if the intake pressure change that is greater than or equal to 3 kPa has occurred ("NO"), it is possible to determine that the engine 1 is rotating. Therefore, the CPU 55 determines whether or not the crank signal counter CTA is "0" (Step S171).

In the case of the crank signal counter CTA=0 ("YES") in Step S171, i.e., if there is no input of a crank signal irrespective of the fact that the engine 1 is rotating, the CPU 55 determines that a failure has occurred in the crank angle sensor 27 (Step S172).

On the other hand, if, in Step S171, the crank signal counter CTA is not "0" ("NO"), i.e., if the engine 1 is rotating and a crank signal is input, it is possible to determine that the crank angle sensor 27 is normal. Therefore, the CPU 55 proceeds to the processing of Step S173.

Subsequently, the CPU 55 determines whether or not the coil voltage counter CTB is "0" (Step S173).

In the case of the coil voltage counter CTB=0 ("YES") in Step S173, i.e., if a negative polarity is not generated in an alternating voltage signal irrespective of the fact that the engine 1 is rotating, the CPU 55 determines that a failure has occurred in the reverse rotation detecting coil 30f (Step S174).

On the other hand, if, in Step S173, the coil voltage counter CTB is not "0" ("NO"), i.e., if the engine 1 is rotating and a negative polarity is generated in an alternating voltage signal, it is possible to determine that the reverse rotation detecting coil 30f is normal. Therefore, the CPU 55 proceeds to the processing of Step S180.

Furthermore, in the case of the intake pressure change counter CTC=0 ("YES") in Step S170, the CPU 55 determines whether or not the crank signal counter CTA is "0" (Step S175).

If, in this Step S175, the crank signal counter CTA is not "0" ("NO"), the CPU 55 determines whether or not the coil voltage counter CTB is "0" (Step S176).

In the case of the coil voltage counter CTB=0 ("YES") in this Step S176, the CPU 55 determines that a failure has occurred in the reverse rotation detecting coil 30f (Step S177). On the other hand, if the coil voltage counter CTB is not "0" ("NO"), the CPU proceeds to the processing of Step S180.

Furthermore, in the case of the intake pressure change counter CTC=0 ("YES") in Step S175, the CPU 55 determines whether or not the coil voltage counter CTB is "0" (Step S178). If the coil voltage counter CTB is not "0" ("NO") (Step S179), the CPU determines that a failure has occurred in the crank angle sensor 27. On the other hand, in the case of the coil voltage counter CTB=0 ("YES"), the CPU proceeds to the processing of Step S180.

Then, the CPU 55 resets the intake pressure change counter CTC, the crank signal counter CTA, and the coil voltage counter CTB to "0" (Step S180), and controls the timer 61 to perform the timer setting of the failure detection cycle, and then returns to the processing of Step S160 (Step S181).

As described above, even by the reverse rotation prevention processing of the fourth embodiment, occurrence of a failure, such as short-circuiting or disconnection, in the reverse rotation detecting coil 30f, can be detected. Furthermore, by performing the same ignition output processing as that in FIG. 11, if the engine is under operation, the ignition output can be permitted, and consequently, occurrence of an engine stall can be prevented.

Moreover, by performing the ignition output with ignition timing at failure detection (crank angle reference position at a failure) that is later than the normal ignition timing (crank angle reference position) after the failure detection, rebounding of kick pedal can be prevented, and engine startup can be enabled.

Moreover, in the fourth embodiment, the failure of the crank angle sensor 27 can also be detected.

In addition, in the second to fourth embodiments, when a failure has been detected, a function to control on/off of an alarm device (notification unit), such as a lamp provided in an external gauge board (so-called instrument panel), and to notify a user of a failure of the reverse rotation detecting coil 30f may be given to the CPU 55.

Conventionally, even if shutdown or disabled startup has occurred at the time of occurrence of a failure, a user would not know the cause of the shutdown. However, troubleshooting becomes easy by providing a function to notify the user that a failure has been detected in this way.

Furthermore, in the above second to fourth embodiments, the reverse rotation detecting coil 30f exclusive for detection of reverse rotation is provided in the generator 30. However the invention is not limited thereto. A magnet-type AC generator that rotates in synchronization with the crankshaft 13 and outputs one-phase alternating voltage signals may be provided in addition to the generator 30, and an exciter coil may be used as the reverse rotation detecting coil 30f.

Furthermore, in the above second and fourth embodiments, the intake pressure is used as an intake state value showing the intake state of the engine 1. However, the invention is not limited thereto. For example, an air intake quantity may be used.

Figure 14:
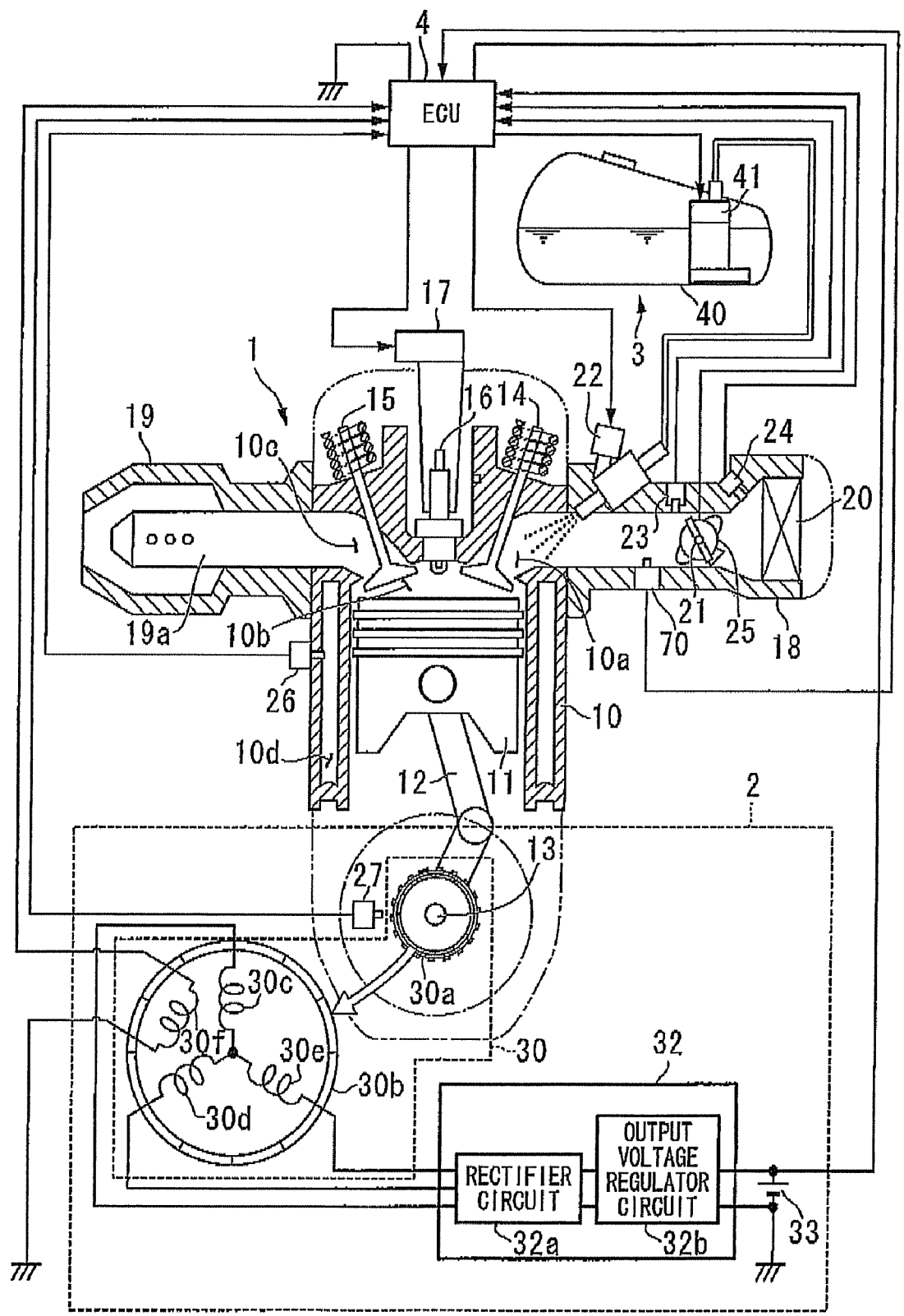
FIG. 14 is a drawing showing the installation position of an air flow sensor 70 when an air intake quantity is used as an intake state value instead of an intake pressure, in the control apparatuses for an internal combustion engine (ECU 4) according to the second to fourth embodiments of the invention.

Specifically, as shown in FIG. 14, the air flow sensor 70 that outputs air intake quantity signals (intake rate signal) according to the air intake quantity (intake rate) within the intake pipe 18 to the downstream of the throttle valve 21 in the intake pipe 18 is provided.

Also, the air intake quantity signals output from the air flow sensor 70 are input to the A/D converter 54 of the ECU 4, and digital air intake quantity signals that are digitally converted by the A/D converter 54 are input to the CPU 55.

As described above, it is preferable to provide the air flow sensor 70 on the downstream side of the throttle valve 21 in order to enhance the detection accuracy of the air intake quantity. However, since the air flow sensor 70 is easily soiled in this position, the air flow sensor may be provided on the upstream side of the throttle valve 21.

What is claimed is:

1. A control apparatus for an internal combustion engine, comprising:
   a crankshaft provided in the internal combustion engine;
   a crank angle detection unit that is provided in the internal combustion engine and that outputs a crank signal each time the crankshaft rotates by a predetermined angle;
   a generator that rotates in synchronization with the rotation of the crankshaft, and that outputs alternating voltage signals with one-phase; and
   a control unit, to which the alternating voltage signals are input, that ascertains ignition timings based on the crank signals, performs ignition control so as to spark the internal combustion engine at the ignition timings, determines a polarity of the alternating voltage signal each time the crank signal is detected, ascertains a polarity cycle of the alternating voltage signals based on the determination result of the polarity, and determines that a failure has occurred in the generator when the polarity cycles do not continuously coincide multiple times with the polarity cycles during forward rotation of the crankshaft.

2. The control apparatus for an internal combustion engine according to claim 1, wherein
   when the control unit determines that a failure has occurred in the generator, the control unit performs ignition control so as to spark the internal combustion engine at the ignition timing which is later than normal ignition timing.

3. The control apparatus for an internal combustion engine according to claim 1, wherein
   the control unit determines that the crankshaft is in reverse rotation at the initial time when the polarity cycle of the alternating voltage signal does not coincide with the polarity cycle during forward rotation of the crankshaft and stops the ignition control at the ignition timings.

4. The control apparatus for an internal combustion engine according to claim 1, further comprising:
   a rotation calculation unit that calculates an engine speed of the crankshaft based on the crank signals, wherein
   when the control unit determines that a failure has occurred in the generator and when the engine speed of the crankshaft is less than a predetermined value, the control unit performs ignition control so as to spark the internal combustion engine at the ignition timing which is later than normal ignition timing.

5. The control apparatus for an internal combustion engine according to claim 4, wherein
   the control unit determines that the crankshaft is in reverse rotation at the initial time when the polarity cycle of the alternating voltage signal does not coincide with the polarity cycle during forward rotation of the crankshaft, and wherein
   when the engine speed of the crankshaft is less than a predetermined value, the control unit stops the ignition control at the ignition timings.

6. The control apparatus for an internal combustion engine according to claim 1, further comprising:
   a notification unit provided in an external of the internal combustion engine, wherein
   when the control unit determines that a failure has occurred in the generator, the control unit controls the notification unit so as to notify a user of a failure occurrence.

7. The control apparatus for an internal combustion engine according to claim 1, further comprising:
   a reference voltage source generating reference voltage signals;
   a comparing unit, to which the alternating voltage signals and the reference voltage signals are input, that compares the voltage value of the alternating voltage signals with the voltage value of the reference voltage signals, and outputs comparison result signals indicating a comparison result; and
   a waveform shaping unit, to which the crank signals are input, that performs waveform shaping so that the crank signals are formed into square-wave pulse signals, the cycle of the pulse signal being the time required for the rotation of the predetermined angle, wherein
   the control unit determines the polarity of the alternating voltage signal based on the comparison result signal each time the pulse signal is detected.

8. A control apparatus for an internal combustion engine, comprising:
- a crankshaft provided in the internal combustion engine;
- a crank angle detection unit that is provided in the internal combustion engine and that outputs a crank signal each time the crankshaft rotates by a predetermined angle;
- a generator that rotates in synchronization with the rotation of the crankshaft, and that outputs alternating voltage signals with one-phase; and
- a control unit, to which the alternating voltage signals are input, that ascertains ignition timings based on the crank signals, performs ignition control so as to spark the internal combustion engine at the ignition timings, determines a polarity of the alternating voltage signal each time the crank signal is detected, and determines that a failure has occurred in the generator when the polarity is not changed.

9. The control apparatus for an internal combustion engine according to claim 8, wherein
- the control unit counts the number of times at which the alternating voltage signal is a predetermined polarity until the ignition timing arrives, and determines that a failure has occurred in the generator when the counting result is less than a predetermined number.

10. The control apparatus for an internal combustion engine according to claim 8, wherein
- when the control unit determines that a failure has occurred in the generator, the control unit performs ignition control so as to spark the internal combustion engine at the ignition timing which is later than normal ignition timing.

11. The control apparatus for an internal combustion engine according to claim 8, further comprising:
- a rotation calculation unit that calculates an engine speed of the crankshaft based on the crank signals, wherein
- when the control unit determines that a failure has occurred in the generator and that the engine speed is less than a predetermined value, the control unit performs the ignition control at the ignition timing which is later than normal ignition timing.

12. The control apparatus for an internal combustion engine according to claim 8, wherein
- when the control unit does not determine that a failure has occurred in the generator, the control unit determines a polarity of the alternating voltage signal at the ignition timing, and wherein
- when the polarity does not coincide with the polarity during forward rotation of the crankshaft, the control unit determines that the crankshaft is in reverse rotation and stops the ignition control at the ignition timings.

13. The control apparatus for an internal combustion engine according to claim 8, further comprising:
- a reference voltage source generating reference voltage signals;
- a comparing unit, to which the alternating voltage signals and the reference voltage signals are input, that compares the voltage value of the alternating voltage signals with the voltage value of the reference voltage signals, and outputs comparison result signals indicating a comparison result; and
- a waveform shaping unit, to which the crank signals are input, that performs waveform shaping so that the crank signals are formed into square-wave pulse signals, the cycle of the pulse signal being the time required for the rotation of the predetermined angle, wherein
- the control unit determines the polarity of the alternating voltage signal based on the comparison result signal each time the pulse signal is detected.

14. The control apparatus for an internal combustion engine according to claim 8, further comprising:
- a notification unit provided in an external of the internal combustion engine, wherein
- when the control unit determines that a failure has occurred in the generator, the control unit controls the notification unit so as to notify a user of a failure occurrence.

15. A control apparatus for an internal combustion engine, comprising:
- a crankshaft provided in the internal combustion engine;
- a crank angle detection unit that is provided in the internal combustion engine and that outputs a crank signal each time the crankshaft rotates by a predetermined angle;
- a generator that rotates in synchronization with the rotation of the crankshaft, and that outputs alternating voltage signals with one-phase;
- an intake state detection unit that detects an intake state value that indicates an intake state in the internal combustion engine, and that outputs intake state signals; and
- a control unit, to which the alternating voltage signals and the intake state signals are input, that ascertains ignition timings based on the crank signals, performs ignition control so as to spark the internal combustion engine at the ignition timings, determines each predetermined cycle whether or not the intake state value is changed based on the intake state signals, determines each predetermined cycle whether or not a polarity of the alternating voltage signal is changed, and determines that a failure has occurred in the generator when the intake state value is changed and the polarity of the alternating voltage signal is not changed.

16. The control apparatus for an internal combustion engine according to claim 15, wherein
- when the number of times at which a difference between a previous intake state value and a current intake state value is greater than or equal to a predetermined value is not zero, the control unit determines that the intake state value is changed, and wherein
- when the number of times at which the alternating voltage signal is a predetermined polarity is zero, the control unit determines that the polarity is not changed.

17. The control apparatus for an internal combustion engine according to claim 15, wherein
- an intake pressure signal corresponding to the intake pressure inside an intake pipe of the internal combustion engine or an intake rate signal corresponding to the intake rate inside the intake pipe is used as the intake state signal.

18. The control apparatus for an internal combustion engine according to claim 15, wherein
- when the control unit determines that a failure has occurred in the generator, the control unit performs ignition control so as to spark the internal combustion engine at the ignition timing which is later than normal ignition timing.

19. The control apparatus for an internal combustion engine according to claim 15, further comprising:
- a rotation calculation unit that calculates an engine speed of the crankshaft based on the crank signals, wherein
- when the control unit determines that a failure has occurred in the generator and that the engine speed is less than a predetermined value, the control unit performs the ignition control at the ignition timing which is later than normal ignition timing.

20. The control apparatus for an internal combustion engine according to claim 15, wherein
when the control unit does not determine that a failure has occurred in the generator, the control unit determines a polarity of the alternating voltage signal at the ignition timing, and wherein
when the polarity does not coincide with the polarity during forward rotation of the crankshaft, the control unit determines that the crankshaft is in reverse rotation and stops the ignition control at the ignition timings.

21. The control apparatus for an internal combustion engine according to claim 15, further comprising:
a reference voltage source generating reference voltage signals;
a comparing unit, to which the alternating voltage signals and the reference voltage signals are input, that compares the voltage value of the alternating voltage signals with the voltage value of the reference voltage signals, and outputs comparison result signals indicating a comparison result; and
a waveform shaping unit, to which the crank signals are input, that performs waveform shaping so that the crank signals are formed into square-wave pulse signals, the cycle of the pulse signal being the time required for the rotation of the predetermined angle, wherein
the control unit determines the polarity of the alternating voltage signal based on the comparison result signal each time the pulse signal is detected.

22. The control apparatus for an internal combustion engine according to claim 15, further comprising:
a notification unit provided in an external of the internal combustion engine, wherein
when the control unit determines that a failure has occurred in the generator, the control unit controls the notification unit so as to notify a user of a failure occurrence.

23. A control apparatus for an internal combustion engine, comprising:
a crankshaft provided in the internal combustion engine;
a crank angle detection unit that is provided in the internal combustion engine and that outputs a crank signal each time the crankshaft rotates by a predetermined angle;
a generator that rotates in synchronization with the rotation of the crankshaft, and that outputs alternating voltage signals with one-phase;
an intake state detection unit that detects an intake state value that indicates an intake state in the internal combustion engine, and that outputs intake state signals; and
a control unit, to which the alternating voltage signals and the intake state signals are input, that ascertains ignition timings based on the crank signals, performs ignition control so as to spark the internal combustion engine at the ignition timings, determines each predetermined cycle whether or not the intake state value is changed based on the intake state signals, determines each predetermined cycle whether or not the crank signal is input and whether or not a polarity of the alternating voltage signal is changed, and that determines that a failure has occurred in the generator when the change of the intake state value is present the input of the crank signal is present, and the change of polarity of the alternating voltage signal is absent.

24. The control apparatus for an internal combustion engine according to claim 23, wherein
when the number of times at which a difference between a previous intake state value and a current intake state value is greater than or equal to a predetermined value is not zero, the control unit determines that the change of the intake state value is present, wherein
when the number of input times of the crank signals is not zero, the control unit determines that the input of the crank signal is present, and wherein
when the number of times at which the alternating voltage signal is a predetermined polarity is zero, the control unit determines that the change of polarity of the alternating voltage signal is absent.

25. The control apparatus for an internal combustion engine according to claim 23, wherein
when the change of the intake state value is present and the input of the crank signal is absent, the control unit determines that a failure has occurred in the crank angle detection unit.

26. The control apparatus for an internal combustion engine according to claim 23, wherein
an intake pressure signal corresponding to the intake pressure inside an intake pipe of the internal combustion engine or an intake rate signal corresponding to the intake rate inside the intake pipe is used as the intake state signal.

27. The control apparatus for an internal combustion engine according to claim 23, wherein
when the control unit determines that a failure has occurred in the generator, the control unit performs ignition control so as to spark the internal combustion engine at the ignition timing which is later than normal ignition timing.

28. The control apparatus for an internal combustion engine according to claim 23, further comprising:
a rotation calculation unit that calculates an engine speed of the crankshaft based on the crank signals, wherein
when the control unit determines that a failure has occurred in the generator and that the engine speed is less than a predetermined value, the control unit performs the ignition control at the ignition timing which is later than normal ignition timing.

29. The control apparatus for an internal combustion engine according to claim 23, wherein
when the control unit does not determine that a failure has occurred in the generator, the control unit determines a polarity of the alternating voltage signal at the ignition timing, and wherein
when the polarity does not coincide with the polarity during forward rotation of the crankshaft, the control unit determines that the crankshaft is in reverse rotation and stops the ignition control at the ignition timings.

30. The control apparatus for an internal combustion engine according to claim 23, further comprising:
a reference voltage source generating reference voltage signals;
a comparing unit, to which the alternating voltage signals and the reference voltage signals are input, that compares the voltage value of the alternating voltage signals with the voltage value of the reference voltage signals, and outputs comparison result signals indicating a comparison result; and
a waveform shaping unit, to which the crank signals are input, that performs waveform shaping so that the crank signals are formed into square-wave pulse signals, the cycle of the pulse signal being the time required for the rotation of the predetermined angle, wherein the control unit determines the polarity of the alternating voltage signal based on the comparison result signal each time the pulse signal is detected.

31. The control apparatus for an internal combustion engine according to claim 23, further comprising:
a notification unit provided in an external of the internal combustion engine, wherein
when the control unit determines that a failure has occurred in the generator, the control unit controls the notification unit so as to notify a user of a failure occurrence.

* * * * *